US012798532B2

(12) United States Patent
Wang et al.

(10) Patent No.: US 12,798,532 B2
(45) Date of Patent: Nov. 17, 2026

(54) BRAKE SYSTEM WITH BOOSTER HAVING A PLURALITY OF CONTROL UNITS

(71) Applicant: Yinwang Intelligent Technologies Co., Ltd., Shenzhen (CN)

(72) Inventors: Lei Wang, Shanghai (CN); Weimiao Yang, Shenzhen (CN); Yongsheng Zhang, Shanghai (CN); Yuhao Lu, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 355 days.

(21) Appl. No.: 18/431,700

(22) Filed: Feb. 2, 2024

(65) Prior Publication Data

US 2024/0174206 A1 May 30, 2024

Related U.S. Application Data

(63) Continuation of application No. PCT/CN2021/110403, filed on Aug. 3, 2021.

(51) Int. Cl.

*B60T 13/68* (2006.01)

*B60T 8/40* (2006.01)

(52) U.S. Cl.

CPC .................................. *B60T 8/4081* (2013.01)

(58) Field of Classification Search

CPC .... B60T 13/686; B60T 13/745; B60T 13/042; B60T 8/4081

See application file for complete search history.

(56) References Cited

U.S. PATENT DOCUMENTS

| | | | | |
|---|---|---|---|---|
| 10,611,348 B2 * | 4/2020 | Zipfel | B60T 7/12 |
| 2018/0334146 A1 | 11/2018 | Feigel | |
| 2019/0092304 A1 * | 3/2019 | Ganzel | B60T 13/686 |
| 2024/0174210 A1 * | 5/2024 | Lenz | B60T 13/686 |

FOREIGN PATENT DOCUMENTS

| | | |
|---|---|---|
| CN | 109070862 A | 12/2018 |
| CN | 110350842 A | 10/2019 |
| CN | 110466489 A | 11/2019 |
| CN | 110962815 A | 4/2020 |
| CN | 111030550 A | 4/2020 |
| CN | 112061099 A | 12/2020 |
| CN | 112188976 A | 1/2021 |
| CN | 112543720 A | 3/2021 |
| CN | 112638728 A | 4/2021 |
| DE | 102011122776 A1 | 1/2013 |
| KR | 20160100395 A | 8/2016 |
| KR | 20180019272 A | 2/2018 |
| KR | 20190103037 A | 9/2019 |

* cited by examiner

*Primary Examiner* — Gonzalo Laguarda

(74) *Attorney, Agent, or Firm* — Leydig, Voit & Mayer, Ltd.

(57) ABSTRACT

A brake system and a control method are provided. The brake control system includes: a master cylinder, a booster, at least one first control valve, at least one second control valve, at least one third control valve, at least one first interface, a first electronic controller, and a second electronic controller. The brake system provided in embodiments of this application has a plurality of redundancy designs, to ensure that the brake system can still meet a plurality of brake function requirements of a vehicle when a controller or a key solenoid valve fails, so as to improve security of the brake system, ensure a pedal feeling of a driver, and bring more stable and comfortable driving experience to the driver.

20 Claims, 24 Drawing Sheets

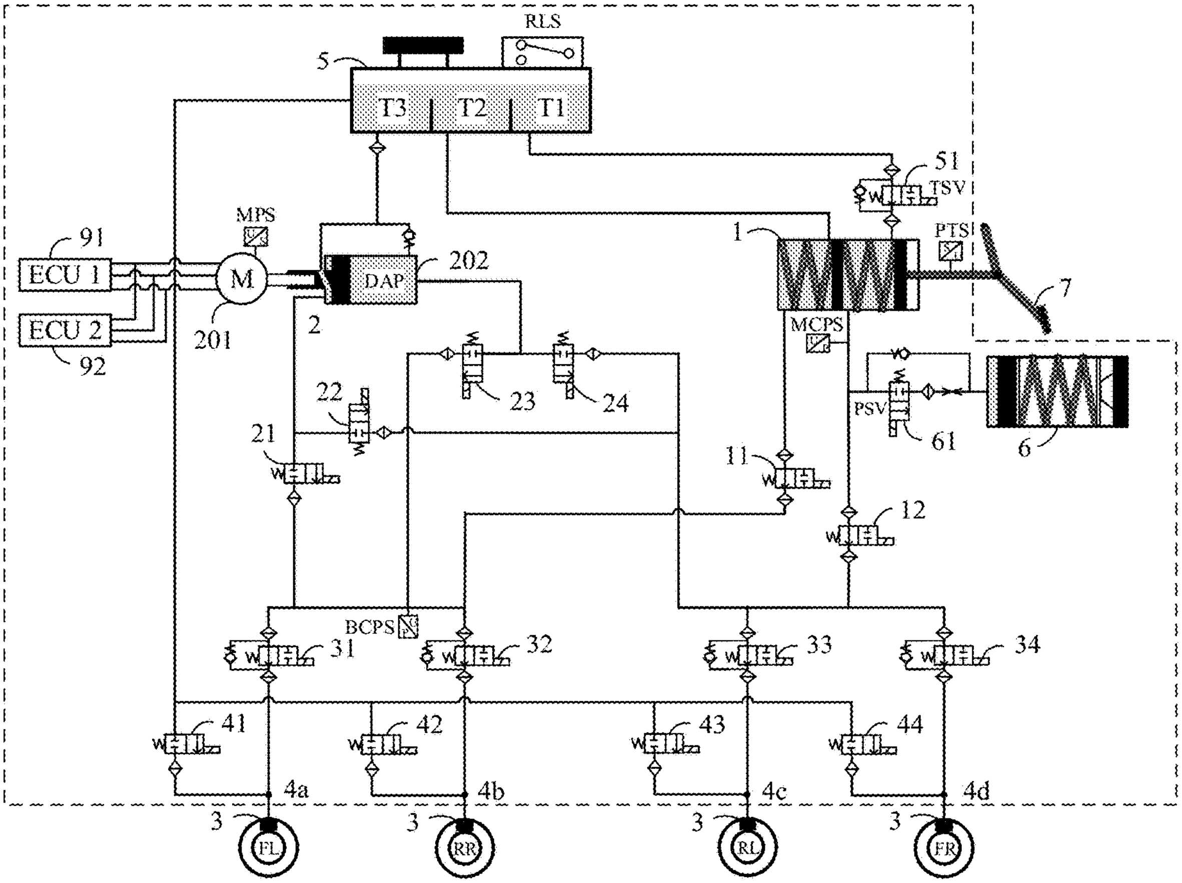
FIG. 3-a

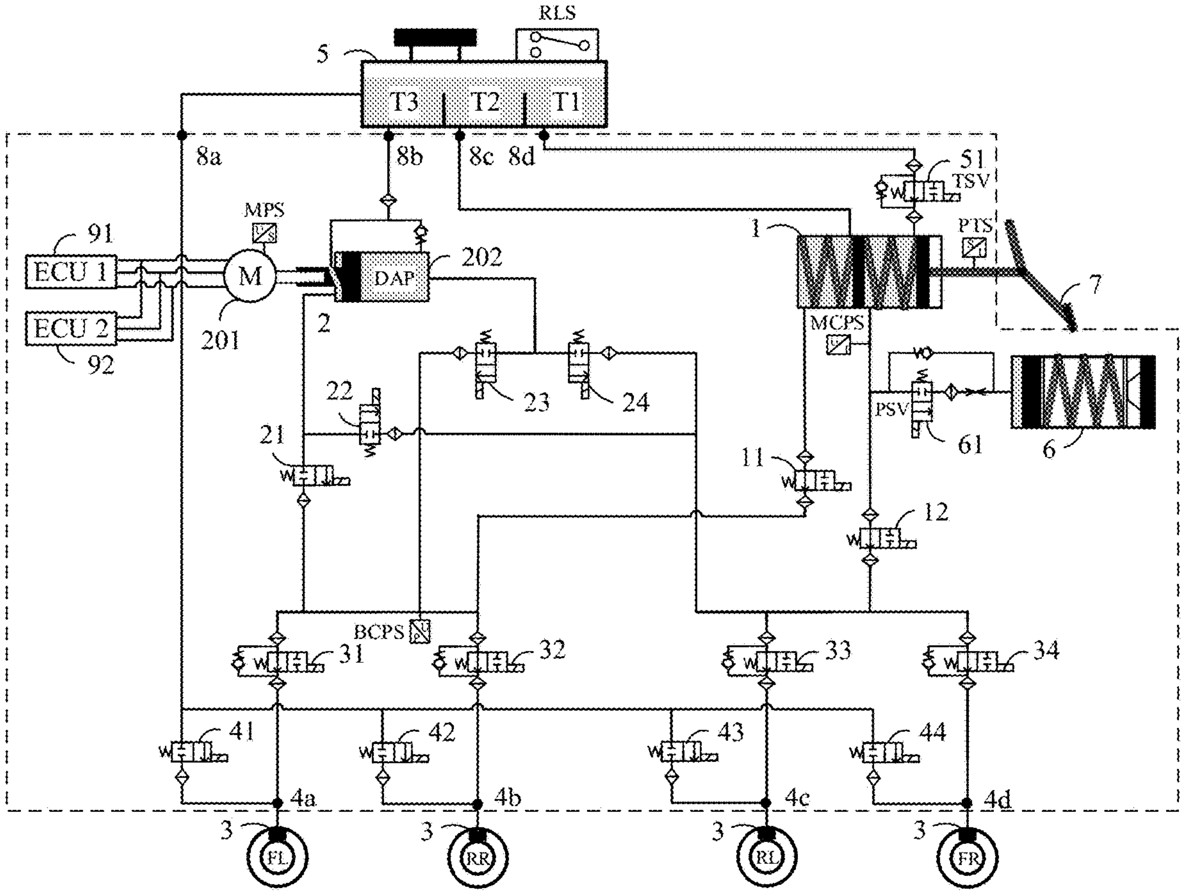
FIG. 3-b

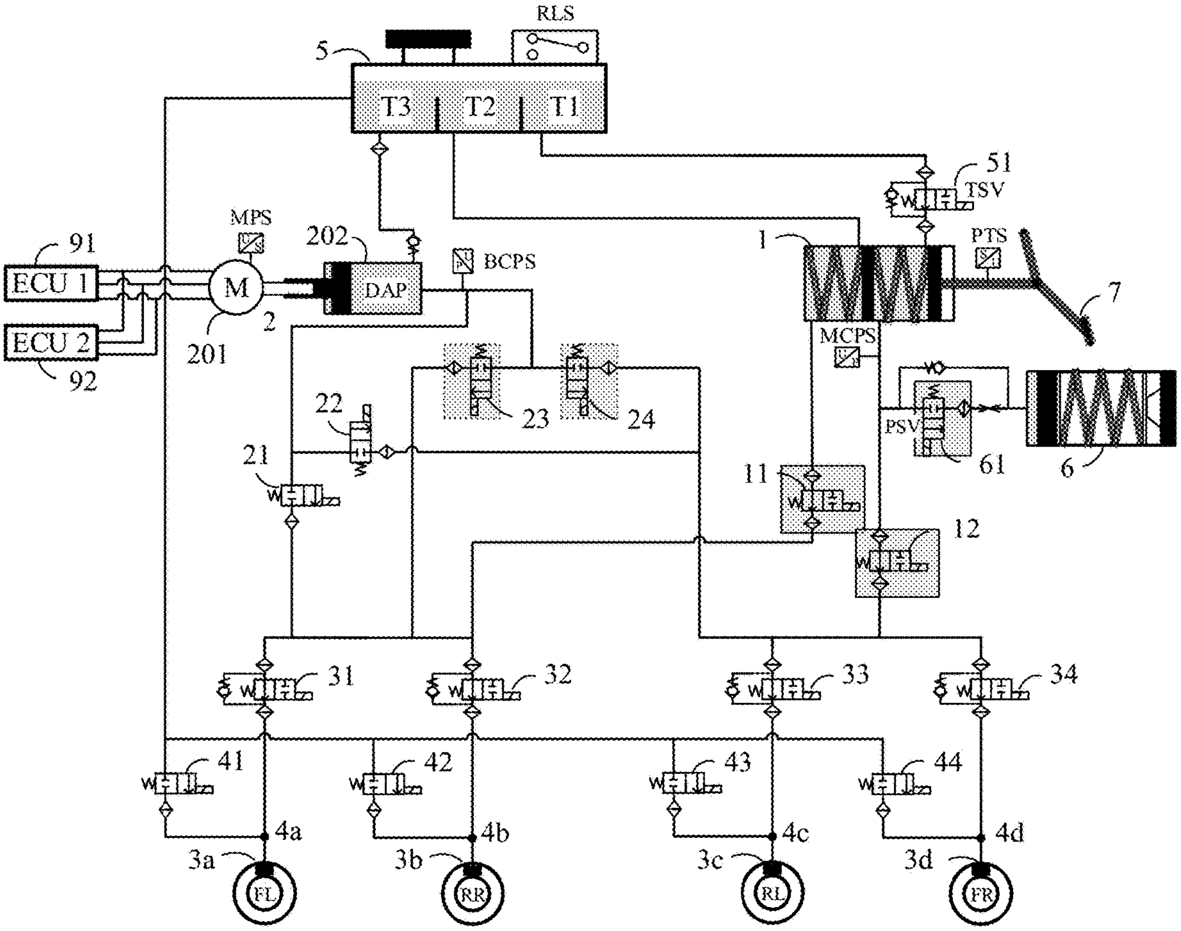
FIG. 10-a

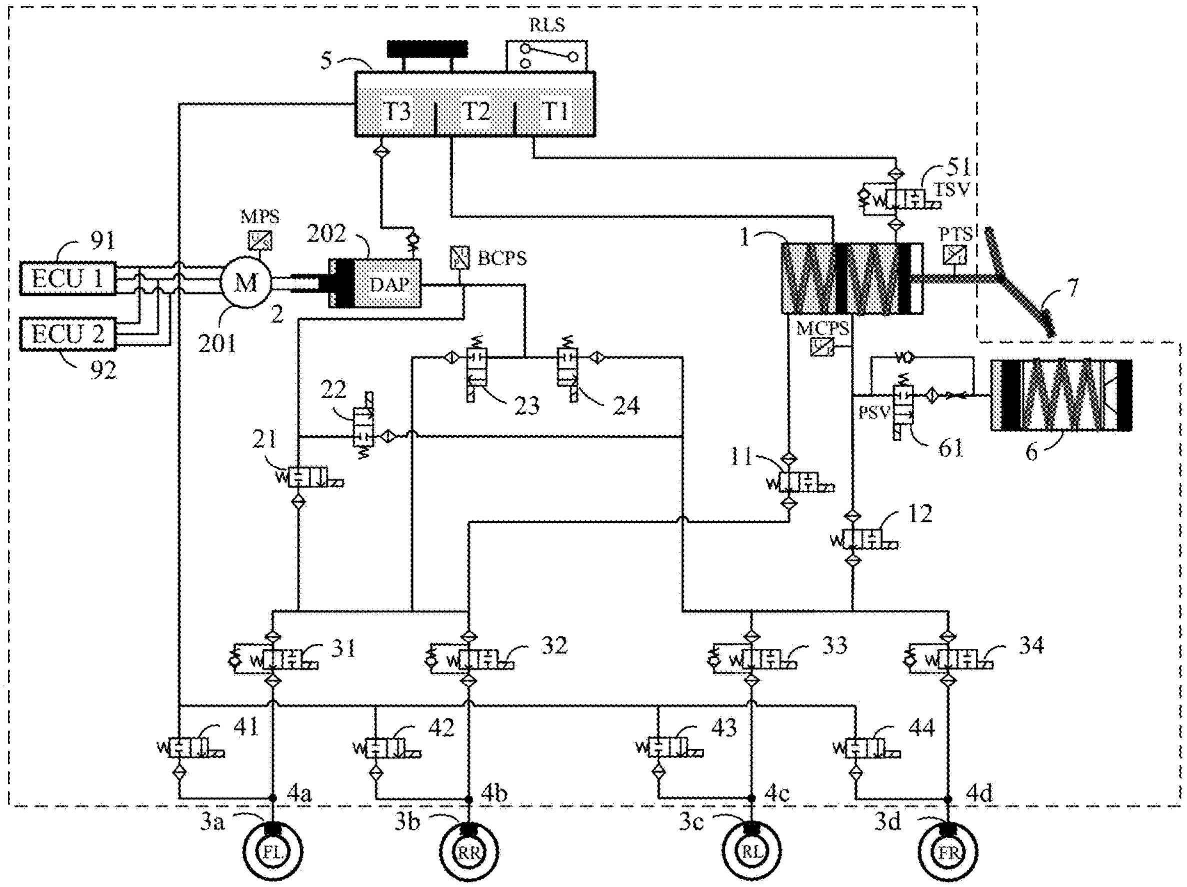
FIG. 10-b

BRAKE SYSTEM WITH BOOSTER HAVING A PLURALITY OF CONTROL UNITS

CROSS-REFERENCE TO RELATED APPLICATIONS

This application is a continuation of International Application No. PCT/CN2021/110403, filed on Aug. 3, 2021, the disclosure of which is hereby incorporated by reference in its entirety.

TECHNICAL FIELD

Embodiments of this application relate to the vehicle braking field, and in particular, to an electro-hydraulic brake system.

BACKGROUND

A brake system can provide functions such as autonomous emergency braking (AEB), an anti-lock brake system (ABS), a traction control system (TCS), and electronic stability control (ESC) during vehicle travelling. However, with development of autonomous driving technologies, challenges faced by the brake system include: meeting requirements for security and reliability of the brake system while meeting miniaturization and low costs, and improving a redundancy degree of the system. In addition, when redundancy backup is performed on the brake system, attention further needs to be paid to how to provide more brake functions to cooperate with functions such as a driving assistance function or autonomous driving while considering costs and system complexity.

SUMMARY

This application relates to a brake system that meets redundancy and safety requirements of an autonomous vehicle. This application provides an electro-hydraulic brake system with multi-redundancy control, to address challenges such as redundancy backup, cost control, and multi-function support that are faced by a current brake system.

A first aspect of this application provides a brake system. In a first possible implementation of the first aspect, the brake system includes: a master cylinder (1), a booster (2), at least one first control valve (11 and 12), at least one second control valve (21, 22, 23, and 24), at least one third control valve (31, 32, 33, and 34), at least one first interface (4), a first control unit (91), and a second control unit (92). A first end of the at least one third control valve (31, 32, 33, and 34) is respectively connected to the at least one first interface (4), and the at least one first interface (4) is configured to be respectively connected to at least one brake wheel cylinder (3). A second end of the at least one third control valve (31, 32, 33, and 34) is connected to the master cylinder (1) through the at least one first control valve (11 and 12). The second end of the at least one third control valve (31, 32, 33, and 34) is further connected to the booster (2) through the at least one second control valve (21, 22, 23, and 24). The at least one third control valve (31, 32, 33, and 34) is configured to be controlled by the first control unit (91). The at least one second control valve (21, 22, 23, and 24) includes at least one first booster branch control valve (21 and 22) and at least one second booster branch control valve (23 and 24), the at least one first booster branch control valve (21 and 22) is configured to be controlled by the first control unit (91), and the at least one second booster branch control valve (23 and 24) is configured to be controlled by the second control unit (92). The booster (2) is configured to be separately controlled by the first control unit (91) and the second control unit (92).

Optionally, the master cylinder may further include more brake main cavities. It should be noted that a second main cavity and a first main cavity may be mutually redundant, to improve reliability of the brake system.

Optionally, there may be four or more third control valves. When a vehicle includes more than four brake wheel cylinders, a quantity of third control valves may also be greater than 4.

Optionally, an interface may be a fluid inlet or a fluid outlet, or may include both a fluid inlet and a fluid outlet, or have functions of both a fluid inlet and a fluid outlet.

According to the first possible implementation of the first aspect, in a second possible implementation, the booster (2) includes a booster drive apparatus (201) and a booster hydraulic cylinder (202), and the booster drive apparatus (201) is configured to be separately controlled by the first control unit (91) and the second control unit (92).

According to the second possible implementation of the first aspect, in a third possible implementation, the booster drive apparatus (201) is a six-phase motor including a first winding and a second winding, the first winding is configured to be controlled by the first control unit (91), and the second winding is configured to be controlled by the second control unit (92).

According to the second or third possible implementation of the first aspect, in a fourth possible implementation, the booster hydraulic cylinder (202) is a bidirectional pressurization hydraulic cylinder, the booster hydraulic cylinder (202) includes a first booster cavity and a second booster cavity, the at least one first booster branch control valve (21 and 22) is connected to the first booster cavity, and the at least one second booster branch control valve (23 and 24) is connected to the second booster cavity.

According to the second or third possible implementation of the first aspect, in a fifth possible implementation, the booster hydraulic cylinder (202) is a unidirectional pressurization hydraulic cylinder, and the at least one first booster branch control valve (21 and 22) and the at least one second booster branch control valve (23 and 24) are connected in parallel, and are separately connected to the booster hydraulic cylinder (202).

According to the fourth or fifth possible implementation of the first aspect, in a sixth possible implementation, a brake fluid reservoir (5) and a fifth control valve (51) are further included. The brake fluid reservoir (5) is separately connected to the master cylinder (1) and the booster (2), a first end of the fifth control valve (51) is connected to the master cylinder (1), and a second end of the fifth control valve (51) is configured to be connected to the brake fluid reservoir (5).

According to the sixth possible implementation of the first aspect, in a seventh possible implementation, a pedal feeling simulator (6) and a sixth control valve (61) are further included. The pedal feeling simulator (6) is connected to the master cylinder (1) through the sixth control valve (61).

According to the seventh possible implementation of the first aspect, in an eighth possible implementation, at least one fourth control valve (41, 42, 43, and 44) is further included. A first end of the at least one fourth control valve (41, 42, 43, and 44) is respectively connected to the at least one first interface (4), the other end of the at least one fourth control valve (41, 42, 43, and 44) is configured to be connected to the brake fluid reservoir (5), and the at least one fourth control valve is configured to be controlled by the first control unit (91).

According to the eighth possible implementation of the first aspect, in a ninth possible implementation, the at least one first booster branch control valve (21 and 22) is further configured to be controlled by the second control unit (92), and the at least one second booster branch control valve (23 and 24) is further configured to be controlled by the first control unit (91).

According to the eighth or ninth possible implementation of the first aspect, in a tenth possible implementation, the at least one third control valve (31, 32, 33, and 34) and the at least one fourth control valve (41, 42, 43, and 44) are further configured to be controlled by the second control unit (92).

According to any one of the eighth to tenth possible implementations of the first aspect, in an eleventh possible implementation, the brake system further includes: The at least one first control valve (11 and 12) is configured to be separately controlled by the first control unit (91) and the second control unit (92). The fifth control valve (51) is configured to be controlled by the first control unit (91). The sixth control valve (61) is configured to be separately controlled by the first control unit (91) and the second control unit (92).

According to any one of the eighth to tenth possible implementations of the first aspect, in a twelfth possible implementation, the brake system further includes a third control unit (93). The at least one first control valve (11 and 12) is configured to be controlled by the third control unit (93). The fifth control valve (51) is configured to be controlled by the third control unit (93). The sixth control valve (61) is configured to be controlled by the third control unit (93).

According to the twelfth possible implementation of the first aspect, in a thirteenth possible implementation, the brake system further includes at least one second interface and at least one third interface. The at least one first control valve (11 and 12) is separately connected to the at least one third control valve (31, 32, 33, and 34) through the at least one second interface, the at least one fourth control valve (41, 42, 43, and 44) is connected to the brake fluid reservoir (5) through the third interface, and the booster (2) is connected to the brake fluid reservoir (5) through the at least one third interface.

A second aspect of this application provides a hydraulic apparatus. In a first possible implementation of the second aspect, the hydraulic apparatus includes: a booster (2), at least one second control valve (21, 22, 23, and 24), at least one third control valve (31, 32, 33, and 34), at least one fourth control valve (41, 42, 43, and 44), a first control unit (91), a second control unit (92), at least one first interface (4), at least one second interface, and at least one third interface. A first end of the at least one third control valve (31, 32, 33, and 34) is respectively connected to the at least one first interface (4), and the at least one first interface (4) is configured to be respectively connected to at least one brake wheel cylinder (3). A second end of the at least one third control valve (31, 32, 33, and 34) is connected to the at least one second interface, and the at least one second interface is configured to be connected to a master cylinder. The second end of the at least one third control valve (31, 32, 33, and 34) is further connected to the booster (2) through the at least one second control valve (21, 22, 23, and 24). The booster (2) is connected to the at least one third interface, and the at least one third interface is configured to be connected to a brake fluid reservoir. A first end of the at least one fourth control valve (41, 42, 43, and 44) is connected to the at least one first interface, and a second end of the at least one fourth control valve (41, 42, 43, and 44) is connected to the at least one third interface. The at least one third control valve (31, 32, 33, and 34) is configured to be controlled by the first control unit (91). The at least one second control valve (21, 22, 23, and 24) includes at least one first booster branch control valve (21 and 22) and at least one second booster branch control valve (23 and 24), the at least one first booster branch control valve (21 and 22) is configured to be controlled by the first control unit (91), and the at least one second booster branch control valve (23 and 24) is configured to be controlled by the second control unit (92). The booster (2) is configured to be separately controlled by the first control unit (91) and the second control unit (92).

According to the first possible implementation of the second aspect, in a second possible implementation, the booster (2) includes a booster drive apparatus (201) and a booster hydraulic cylinder (202), and the booster drive apparatus (201) is configured to be separately controlled by the first control unit (91) and the second control unit (92).

According to the second possible implementation of the second aspect, in a third possible implementation, the booster drive apparatus (201) is a six-phase motor including a first winding and a second winding, the first winding is configured to be controlled by the first control unit (91), and the second winding is configured to be controlled by the second control unit (92).

According to the second or third possible implementation of the second aspect, in a fourth possible implementation, the booster hydraulic cylinder (202) is a bidirectional pressurization hydraulic cylinder, the booster hydraulic cylinder (202) includes a first booster cavity and a second booster cavity, the at least one first booster branch control valve (21 and 22) is connected to the first booster cavity, and the at least one second booster branch control valve (23 and 24) is connected to the second booster cavity.

According to the second or third possible implementation of the second aspect, in a fifth possible implementation, the booster hydraulic cylinder (202) is a unidirectional pressurization hydraulic cylinder, and the at least one first booster branch control valve (21 and 22) and the at least one second booster branch control valve (23 and 24) are connected in parallel, and are separately connected to the booster hydraulic cylinder (202).

According to the fourth or fifth possible implementation of the second aspect, in a sixth possible implementation, the at least one first booster branch control valve (21 and 22) is further configured to be controlled by the second control unit (92), and the at least one second booster branch control valve (23 and 24) is further configured to be controlled by the first control unit (91).

According to the sixth possible implementation of the second aspect, in a seventh possible implementation, the at least one third control valve (31, 32, 33, and 34) and the at least one fourth control valve (41, 42, 43, and 44) are further configured to be controlled by the second control unit (92).

A third aspect of this application provides a brake system. In a first possible implementation of the third aspect, the brake system includes a first hydraulic apparatus and a second hydraulic apparatus. The first hydraulic apparatus is the hydraulic apparatus provided in any possible implementation of the second aspect, and the second hydraulic apparatus includes: a master cylinder (1), at least one first control valve (11 and 12), a brake fluid reservoir (5), a fifth control valve (51), a pedal feeling simulator (6), a sixth control valve (61), and a third control unit (93). The master cylinder (1) is connected to at least one second interface through the at least one first control valve (11 and 12). The brake fluid reservoir (5) is separately connected to the master cylinder (1) and at least one third interface. A first end of the fifth control valve (51) is connected to the master cylinder (1), and a second end of the fifth control valve (51) is connected to the brake fluid reservoir (5). The pedal feeling simulator (6) is connected to the master cylinder (1) through the sixth control valve (61). The at least one first control valve (11 and 12), the fifth control valve (51), and the sixth control valve (61) are separately configured to be controlled by the third control unit (93).

A fourth aspect of this application provides a control method. In a first possible implementation of the fourth aspect, a brake system is the brake system provided in the eleventh possible implementation of the eighth aspect, and the control method includes: obtaining a first signal, where the first signal indicates fault information of the brake system; and controlling, based on the first signal, at least one first control valve (11 and 12) to switch to a first state, and at least one second control valve (21, 22, 23 and 24) to switch to a second state.

According to the first possible implementation of the fourth aspect, in a second possible implementation, the first signal includes information indicating a fault of a first control unit (91). The first state includes: The at least one first control valve (11 and 12) is configured to be in a disconnected state. The second state includes: At least one second booster branch control valve (23 and 24) is configured to be in a connected state.

According to the first possible implementation of the fourth aspect, in a third possible implementation, the first signal includes information indicating a fault of a second control unit (92). The first state includes: The at least one first control valve (11 and 12) is configured to be in a disconnected state. The second state includes: At least one first booster branch control valve (21 and 22) is configured to be in a connected state.

According to the third possible implementation of the fourth aspect, in a fourth possible implementation, the control method further includes: adjusting a state of at least one third control valve (31, 32, 33, and 34) and/or at least one fourth control valve (41, 42, 43, and 44) based on target braking pressure.

A fifth aspect of this application provides a control method, applied to a brake system. In a first possible implementation of the fifth aspect, the brake system is the brake system provided in the twelfth or thirteenth possible implementation of the first aspect, and the control method includes: obtaining a second signal, where the second signal indicates fault information of the brake system; and controlling, based on the second signal, at least one second control valve (21, 22, 23, and 24) to switch to a third state.

According to the first possible implementation of the fifth aspect, in a second possible implementation, the second signal includes fault information of a first control unit (91). The third state includes: At least one second booster branch control valve (23 and 24) is configured to be in a connected state.

According to the first possible implementation of the fifth aspect, in a third possible implementation, the second signal includes information indicating a fault of a second control unit (92). The third state includes: At least one first booster branch control valve (21 and 22) is configured to be in a connected state.

According to the second or third possible implementation of the fifth aspect, in a fourth possible implementation, the control method further includes: adjusting a state of at least one third control valve (31, 32, 33, and 34) and/or at least one fourth control valve (41, 42, 43, and 44) based on target braking pressure.

A sixth aspect of this application provides a control method, applied to a brake system. In a first possible implementation of the sixth aspect, the brake system is the twelfth or thirteenth possible implementation of the first aspect, and the control method includes: obtaining a third signal, where the third signal indicates fault information of the brake system; and controlling, based on the third signal, at least one first control valve (11 and 12) to switch to a fourth state.

According to the first possible implementation of the sixth aspect, in a second possible implementation, the third signal includes information indicating a fault of a first control unit (91), or the third signal includes information indicating a fault of a second control unit (92). The fourth state includes: The at least one first control valve (11 and 12) is configured to be in a disconnected state.

A seventh aspect of this application provides a readable storage medium. The readable storage medium stores program instructions, and when the program instructions are executed, the method provided in any possible implementation of the fourth aspect, the fifth aspect, or the sixth aspect is performed.

An eighty aspect of this application provides a vehicle. The vehicle includes the brake system provided in any possible implementation of the first aspect or the third aspect, or includes the hydraulic apparatus provided in any possible implementation of the second aspect.

The brake system provided in embodiments of this application has a plurality of redundancy designs, to ensure that the brake system can still meet a plurality of brake function requirements of a vehicle when a controller or a key solenoid valve fails, so as to improve security of the brake system, ensure a pedal feeling of a driver, and bring more stable and comfortable driving experience to the driver.

BRIEF DESCRIPTION OF DRAWINGS

FIG. 3-*a* is a schematic diagram of a brake system and an integration manner of the brake system according to an embodiment of this application;

FIG. 3-*b* is a schematic diagram of a brake system and another integration manner of the brake system according to an embodiment of this application;

FIG. 10-*a* is a schematic diagram of another brake system according to an embodiment of this application;

FIG. 10-*b* is a schematic diagram of an integration manner of another brake system according to an embodiment of this application;

DESCRIPTION OF EMBODIMENTS

Figure 1:
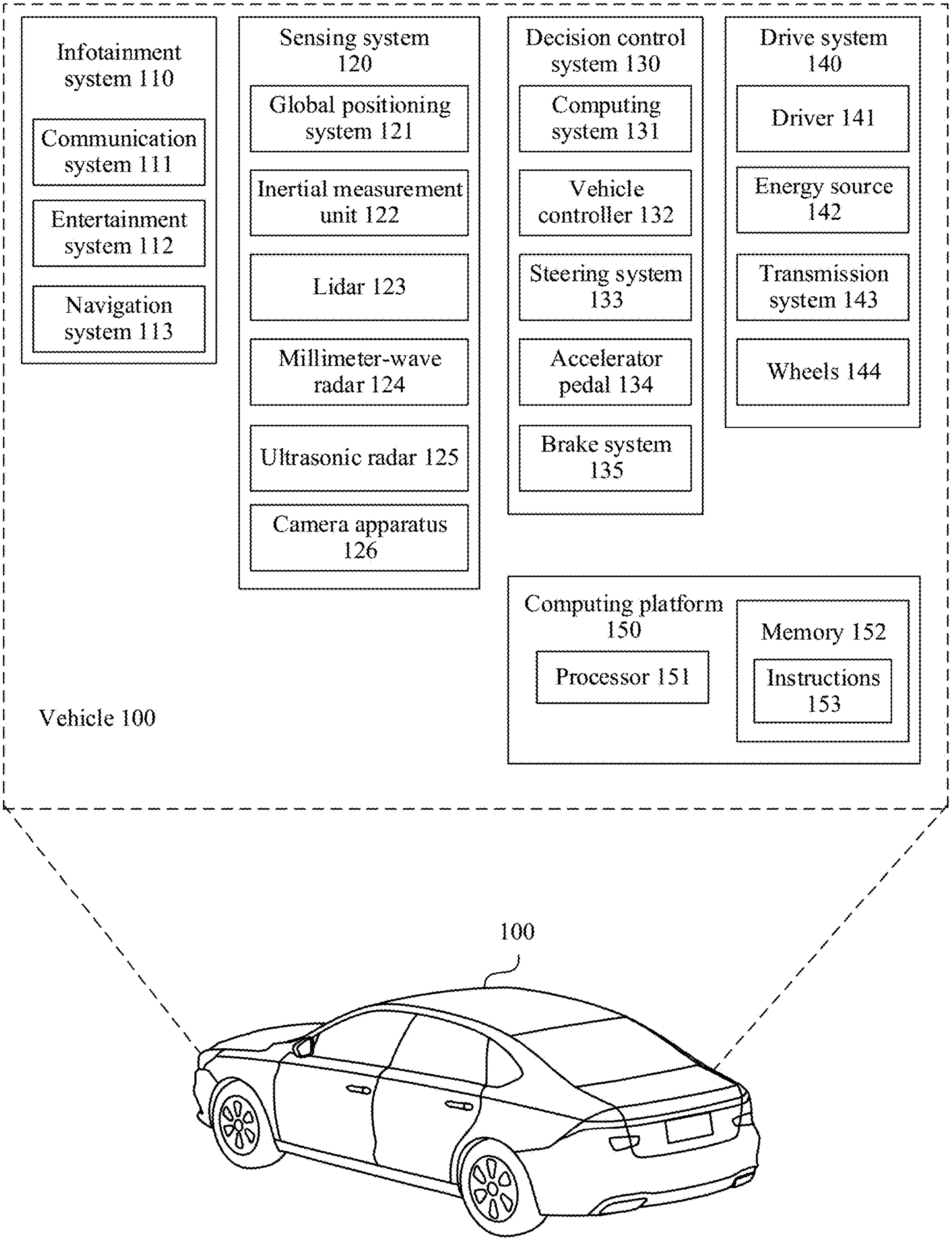
FIG. 1 is a schematic diagram of a system architecture of an entire vehicle according to an embodiment of this application.

The following describes technical solutions of this application with reference to accompanying drawings. It is clear that the described embodiments are merely some but not all of embodiments provided in this application. All other embodiments obtained by a person of ordinary skill in the art based on embodiments of this application without creative efforts shall fall within the protection scope of this application.

For ease of understanding, related terms and concepts that may be used in embodiments of this application are first described in the specification of this application.

Anti-lock braking system (ABS): Generally, when a vehicle brakes in an emergency or on an icy or snowy road, wheels tend to lock. Wheel locking brings problems such as increasing a braking distance and losing a steering intention. The ABS system appropriately reduces, based on a wheel locking status, a braking force at the wheels that tend to lock, to implement an anti-lock function.

Autonomous emergency braking (AEB) system: When a vehicle encounters an emergency or a distance between the vehicle and a vehicle ahead or a pedestrian is less than a safe distance, the vehicle automatically brakes, to avoid or reduce collision accidents such as tail chasing.

Electronic stability control (ESC) system: A sensor collects vehicle information to determine vehicle instability. When a vehicle tends to be unstable, the ESC system applies a braking force to a single wheel or some wheels to obtain yaw torque that stabilizes the wheels, thereby stabilizing the vehicle.

Traction control system (TCS): When a vehicle travels on an icy or snowy road, a wheel is stuck on a muddy road, or the like, the vehicle cannot normally travel because wheels slip seriously. Based on a wheel slipping status, the TCS system appropriately reduces a driving force or applies a braking force to the slipping wheels, to reduce wheel slippage and ensure normal traveling of the vehicle.

Adaptive cruise control (ACC): On a system that performs cruise control based on a preset vehicle speed, a system having a control function of maintaining an appropriate distance with a vehicle ahead is added. Sub-functions of the system include fixed-speed cruise, following cruise, curve cruise, driving mode selection, intelligent curve passing, intelligent speed limiting, and the like. A cruise function is mainly implemented by controlling a vehicle speed by using a brake system and a drive system.

Integrated brake system (IBS): The IBS is an electro-hydraulic line control system including an electric linear pump, a solenoid valve, a valve body, and the like, and the system can implement brake functions such as ABS/AEB/TCS/ESC of a vehicle.

Redundant brake unit (RBU): The RBU is an independent brake unit that backs up a primary brake system, and when the primary brake system of a vehicle fails, the RBU unit completes vehicle braking, to improve safety of the vehicle.

Other terms or concepts in the specification of this application further include: a reservoir level sensor (RLS), a test simulation valve (TSV), a pedal travel sensor (PTS), a master cylinder pressure sensor (MCPS), a brake circuit pressure sensor (BCPS), an electronic control unit (ECU), a basic brake function (BBF), and the like.

It should be noted that descriptions of the terms and the concepts are merely for understanding, and should not be construed as a limitation on embodiments of this application.

The following describes a brake system provided in embodiments of this application with reference to FIG. 1 to FIG. 20 in the specification of this application.

Vehicles are undergoing electrified, networked, and intelligent transformations. For the vehicles, various systems, including the brake system, also face changes and upgrades. A structural change and a function upgrade of the brake system are closely related to innovation of a vehicle architecture. Specifically, the following describes each system of an entire vehicle with reference to FIG. 1.

FIG. 1 is a schematic diagram of a vehicle 100 according to an embodiment of this application. The vehicle 100 may include various subsystems, such as an infotainment system 110, a sensing system 120, a decision control system 130, a drive system 140, and a computing platform 150. Optionally, the vehicle 100 may include more or fewer subsystems, and each subsystem may include a plurality of components. In addition, each subsystem and component of the vehicle 100 may be interconnected in a wired or wireless manner.

For the vehicle, a brake system 135 is one of the most critical systems, and is directly related to comprehensive performance of the vehicle and life and property safety of a passenger. The brake system 135 may be configured to control a speed of the vehicle 100. The brake system 135 may slow down a rotation speed of wheels 144 by using friction. In some embodiments, the brake system 135 may further have an energy regeneration brake function. In addition, the brake system 135 may alternatively control the speed of the vehicle 100 in another manner.

For the regeneration brake function, when the vehicle decelerates or brakes, a part of mechanical energy of the vehicle may be converted into electric energy by using a motor and the electric energy is stored in a battery, and a part of braking force is generated to implement deceleration or braking of the vehicle. When the vehicle accelerates again, the motor reconverts energy stored in the battery into kinetic energy for traveling of the vehicle. However, due to challenges such as a brake strength limitation, regenerative braking cannot meet requirements of all braking conditions. Therefore, a hydraulic brake system still has high application value in new energy vehicles.

Development of vehicle intelligence provides more possibilities for function development of the brake system. As shown in FIG. 1, the vehicle 100 provided in this embodiment of this application may be configured to be in a full or partial autonomous driving mode. For example, the vehicle 100 may obtain ambient environment information of the vehicle by using the sensing system 120, and obtain an autonomous driving policy based on analysis of the ambient environment information, to implement full-autonomous driving, or present an analysis result to a user, to implement partial autonomous driving. In some embodiments, the vehicle 100 may adjust the vehicle speed of the vehicle by sensing an ambient environment of the vehicle. The ambient environment may include a traffic participant such as another vehicle and/or a pedestrian, or may include a road, infrastructure, or another object. In some examples, the vehicle 100 may autonomously recognize the ambient environment, and determine the vehicle speed of the vehicle based on information (such as a speed, an acceleration, and a distance from the vehicle) about an object in the environment.

Improvement of vehicle computing and control resources provides more choices for a design of a brake system control method. As shown in FIG. 1, some or all functions of the vehicle 100 provided in this embodiment of this application are controlled by the computing platform 150. The computing platform 150 may control various functions of the vehicle 100 based on inputs received from various subsystems (for example, the drive system 140, the sensing system 120, and the decision control system 130). In particular, for the brake system 135, the computing platform 150 can bring more possibilities for functional development of the brake system 135. For example, the computing platform 150 may control the brake system 135 based on an input from the decision control system 130, to avoid collision with an obstacle detected by the sensing system 120.

The following describes the computing platform 150 with reference to FIG. 1.

The computing platform 150 may include at least one processor 151, and the processor 151 may execute instructions 153 stored in a non-transitory computer readable medium such as a memory 152. In some embodiments, the computing platform 150 may alternatively be a plurality of computing devices that control individual components or subsystems of the vehicle 100 in a distributed manner.

For the computing platform 150 shown in FIG. 1, the processor 151 may be any conventional processor, for example, a central processing unit (CPU). Alternatively, the processor 151 may further include a graphics processing unit (GPU), a field programmable gate array (FPGA), a system on chip (SOC), an application-specific integrated circuit (ASIC), or a combination thereof. Although FIG. 1 functionally illustrates the processor, the memory, and another component, a person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer. Therefore, it is understood that a reference to the processor or the computer includes a reference to a set of processors or computers or memories that may or may not operate in parallel. Different from using a single processor to perform the steps described herein, some components such as a steering component and a brake component may include respective processors. The processor performs only computation related to a component-specific function. In various aspects described herein, the processor may be located far away from the vehicle and wirelessly communicate with the vehicle. In another aspect, some processes described herein are performed on a processor disposed inside the vehicle, while others are performed by a remote processor, including performing steps necessary for single manipulation. In some embodiments, the memory 152 may include the instructions 153, for example, program logic. The instructions 153 may be executed by the processor 151 to perform various functions of the vehicle 100. The memory 152 may also include additional instructions, including instructions used to send data to, receive data from, interact with, and/or control one or more of the infotainment system 110, the sensing system 120, the decision control system 130, and the drive system 140. In some embodiments, in addition to the instructions 153, the memory 152 may further store data, such as a road map, route information, a position, a direction, a speed, and other vehicle data of the vehicle, and other information. The information may be used by the vehicle 100 and the computing platform 150 during operation of the vehicle 100 in autonomous, semi-autonomous, and/or manual modes.

It should be noted that FIG. 1 should not be understood as a limitation on embodiments of this application. Optionally, one or more of the components may be installed separately from or associated with the vehicle 100. For example, the memory 152 may exist partially or completely separate from the vehicle 100. The components may be communicatively coupled together in a wired and/or wireless manner. Optionally, the components are merely an example. In actual application, components in the modules may be added, deleted, or re-divided based on an actual requirement. In addition, the vehicle 100 may be a passenger vehicle, a commercial vehicle, a motorcycle, a dedicated vehicle (such as a fire engine, an ambulance, a mining vehicle, or a road construction vehicle), a rail vehicle, a ship, an aircraft, or the like. This is not particularly limited in embodiments of this application.

Figure 2:
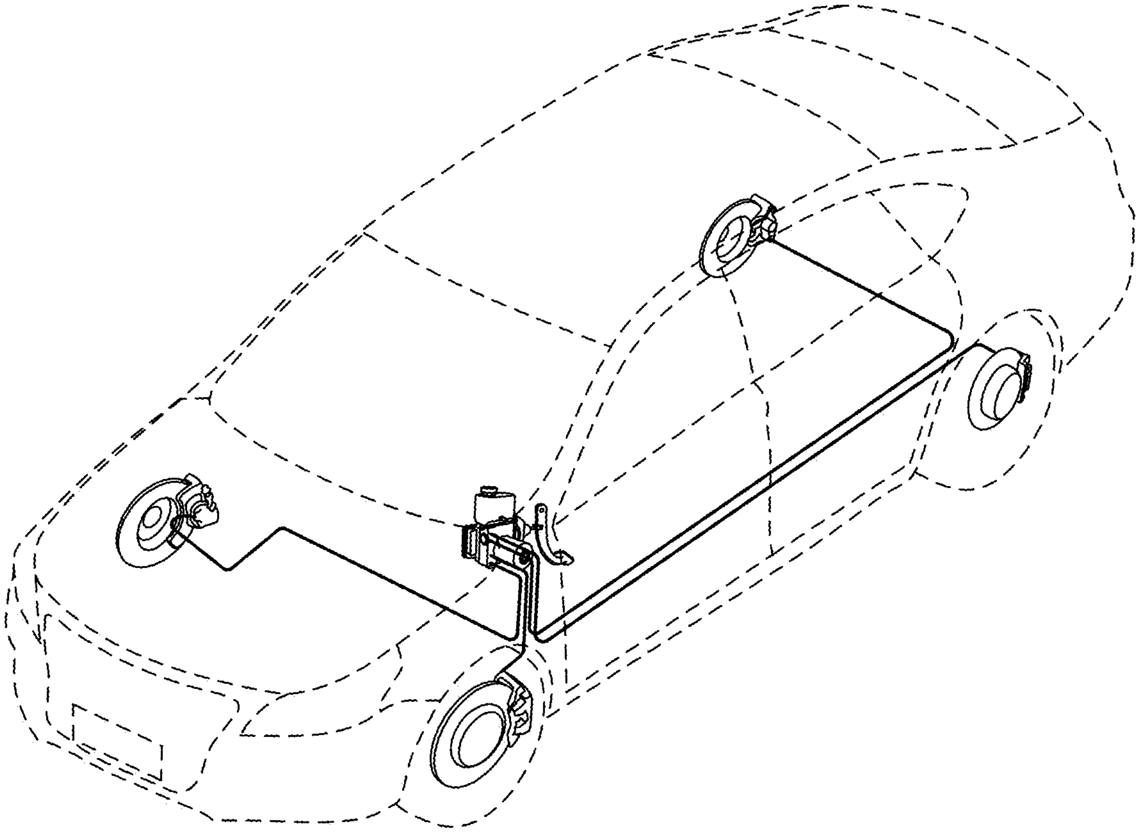
FIG. 2 is a schematic diagram of an arrangement form of a brake system in a vehicle according to an embodiment of this application.

For ease of understanding a form of a brake system in an entire vehicle arrangement, as shown in FIG. 2, the specification of this application further provides a schematic diagram of a brake system arranged in a vehicle. In some embodiments, an arrangement form of the brake system 135 in the vehicle may be shown in FIG. 2. In some embodiments, the brake system 135 may include components such as a brake pedal, a master cylinder, a booster, a brake pipe, and a brake wheel cylinder. When a driver steps down the brake pedal, or when a brake signal is received, the master cylinder or the booster provides brake pressure to the brake wheel cylinder and further drives a brake actuator to brake the vehicle.

Certainly, in addition to the possible arrangement form provided in FIG. 2, the brake system may alternatively be arranged in the vehicle in another manner. For example, wheels of a rear axle may use mechanical braking. For another example, when the vehicle includes more wheels, for example, when the vehicle includes six wheels, the brake system may further include more brake pipes and more brake wheel cylinders. Therefore, it should be noted that FIG. 2 is merely a possible arrangement manner of the brake system provided in embodiments of this application, and should not be construed as a limitation on embodiments of this application.

Therefore, it can be understood from the foregoing descriptions that a development trend of electrification, networking, and intelligence imposes higher requirements on reliability and safety of a vehicle brake system, and also brings more possibilities for development of a function of the brake system.

In face of these new challenges and opportunities, the brake system provided in embodiments of this application can ensure that a vehicle can still implement a vehicle brake function by using a redundant controller when a primary brake system controller or a key solenoid valve fails. In addition, in some embodiments, brake function requirements such as ABS/AEB/TCS/ESC of the vehicle can be further met, thereby greatly improving safety and reliability of the vehicle.

The following describes in detail the brake system provided in this application with reference to specific embodiments.

First, it should be noted that a name of a control valve in the brake system in the specification of this application does not represent a type of the control valve, but only represents a function of the control valve. For example, an "isolation valve", a "pressurization valve", a "depressurization valve", a "solenoid valve jointly driven by two controllers", a "solenoid valve independently driven by a single controller", and the like that may appear in embodiments of this application are not intended to limit types of the involved control valves. For example, a control valve configured to control a connection or disconnection of a fluid inlet pipe may be referred to as a "fluid inlet valve" or a "pressurization valve". A controller configured to control a connection or disconnection of a fluid return pipe may be referred to as a "fluid outlet valve" or a "depressurization valve". A control valve configured to isolate a two-stage brake subsystem may be referred to as an "isolation valve". The control valve may be a common valve in an existing brake system, for example, a solenoid valve. It should be understood that the type of the control valve is not limited in this application.

In addition, it should be noted that the brake pipe in the specification of this application may be only a "fluid outlet pipe" or a "fluid inlet pipe", or the brake pipe may be a "fluid outlet pipe" and a "fluid inlet pipe". For example, in a process of depressurizing the brake wheel cylinder of the wheel of the vehicle, the brake pipe in the brake system is configured to transfer brake fluid in the brake wheel cylinder to a fluid storage apparatus. In this case, the brake pipe may be referred to as a "fluid outlet pipe". In a process of pressurizing the brake wheel cylinder of the wheel of the vehicle, the brake pipe is configured to provide brake fluid for the wheel of the vehicle, so as to provide a braking force for the wheel of the vehicle. In this case, the brake pipe may be referred to as a "fluid inlet pipe".

Then, it should be noted that the brake system and the brake wheel cylinder provided in this embodiment of this application may be connected in a plurality of forms, for example, may be arranged in an X-shaped manner, an H-shaped manner, or an I-shaped manner. The X-shaped arrangement may be that one brake circuit connects a brake wheel cylinder of a front left (FL) wheel and a brake wheel cylinder of a rear right (RR) wheel, and another brake circuit connects a brake wheel cylinder of a front right (FR) wheel and a brake wheel cylinder of a rear left (RL) wheel. The H-shaped arrangement may be that one brake circuit connects a brake wheel cylinder of a front left FL wheel and a brake wheel cylinder of a rear left RL wheel, and another brake circuit connects a brake wheel cylinder of a front right FR wheel and a brake wheel cylinder of a rear right RR wheel. The I-shaped arrangement may be that one brake circuit connects a brake wheel cylinder of a front left FL wheel and a brake wheel cylinder of a front right FR wheel, and another brake circuit connects a brake wheel cylinder of a rear left RL wheel and a brake wheel cylinder of a rear right RR wheel. It should be understood that although an X-shaped brake circuit is used as an example in some embodiments provided in this application, a brake circuit type is not limited in embodiments of this application.

In addition, it should be noted that, in some embodiments provided in this application, the specification of this application does not show a process of generating a motor control signal, and a connection relationship between a control unit and a booster drive apparatus represents only a control relationship.

In addition, it should be noted that, in the specification of this application, a first control unit 91 is also referred to as an ECU 1 in some embodiments, a second control unit 92 is also referred to as an ECU 2 in some embodiments, and a third control unit 93 is also referred to as an ECU 3 in some embodiments.

In addition, it should be noted that, in some embodiments provided in this application, a control unit may be a controller or may be integrated into a controller, and the controller further includes at least various solenoid valve drives and motor drives and various output interfaces for signal processing and control. The controller receives, from various sensors, measurement or detection signals, such as an environment condition, a driver input, and a brake system status; and controls brake features of the brake system through calculation and determining.

In addition, it should be noted that, a normal open valve in the specification of this application may be understood as a control valve in an open state under an initial condition of no power-on or no action, and the normal open valve switches from the open state to a closed state when the normal open valve is powered on or performs an action. A normal closed valve in the specification of this application may be understood as a control valve that is closed under an initial condition of no power-on or no action, and the normal closed valve switches from a closed state to an open state when the normal closed valve is powered on or performs an action.

Figure 20:
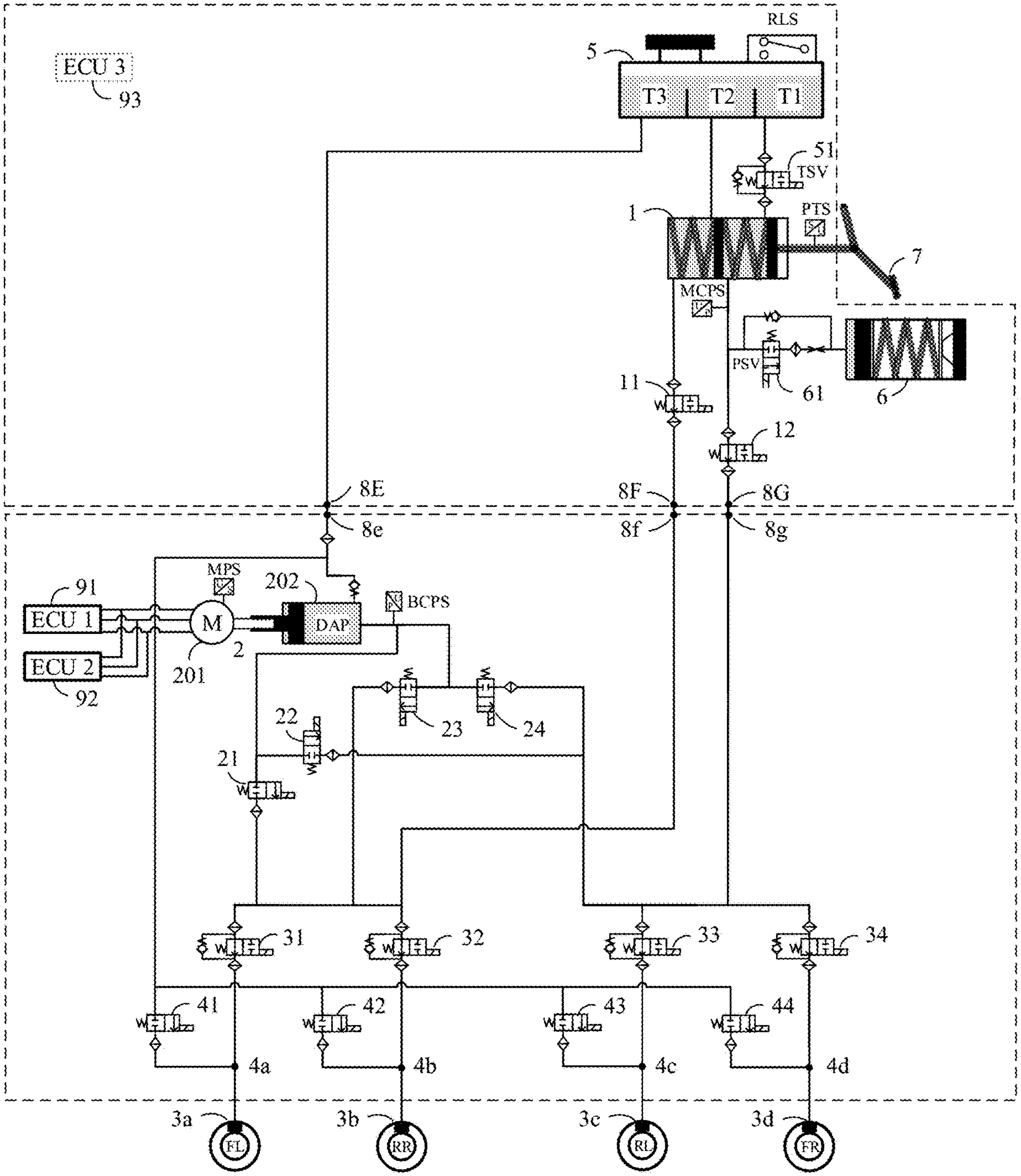
FIG. 20 is a schematic diagram of another brake system according to an embodiment of this application.

Based on the descriptions, the specification of this application describes embodiments of this application in detail with reference to FIG. 3-*a* to FIG. 20.

Embodiment 1

FIG. 3-*a* and FIG. 3-*b* each are a schematic diagram of a brake system according to Embodiment 1 of this application. As shown in FIG. 3-*a* and FIG. 3-*b*, the brake system provided in Embodiment 1 of this application includes: a master cylinder 1, a booster 2, first control valves (11 and 12), second control valves (21, 22, 23, and 24), third control valves (31, 32, 33, and 34), fourth control valves (41, 42, 43, and 44), a first control unit 91, and a second control unit 92.

It should be noted herein that, the first control valves (11 and 12) in the specification of this application may also be referred to as master cylinder isolation valves; the second control valves (21, 22, 23, and 24) may also be referred to as booster branch control valves; the third control valves (31, 32, 33, and 34) may also be referred to as pressurization valves or wheel cylinder pressurization valves; the fourth control valves (41, 42, 43, and 44) may also be referred to as depressurization valves, wheel cylinder depressurization valves, or relief valves; a fifth control valve (51) may also be referred to as a test simulation valve (test simulation valve, TSV); and a sixth control valve (61) may also be referred to as a pedal simulation valve (pedal simulation valve, PSV). It should be understood that descriptions of a function of a control valve should not be understood as a limitation on a type of the control valve.

Optionally, in Embodiment 1, the master cylinder 1 includes two hydraulic cavities that can output pressure to the outside, which are respectively denoted as a first main cavity and a second main cavity. The first main cavity and the second main cavity each are connected to a wheel cylinder brake pipe through a first master cylinder isolation valve 11 and a second master cylinder isolation valve 12.

Optionally, in Embodiment 1, the master cylinder 1 may further include a master cylinder push rod. The master cylinder push rod is configured to be connected to a brake pedal. When receiving a pedal force, the master cylinder push rod may push a piston of the master cylinder to increase oil pressure in the master cylinder.

Optionally, in Embodiment 1, the brake system may further include a pedal travel sensor PTS. The pedal travel sensor PTS may be configured to collect a travel signal of the brake pedal.

Optionally, in Embodiment 1, the brake system may further include a brake pedal 7. The brake pedal 7 is connected to the master cylinder push rod of the brake system. As shown in FIG. 3-*a* and FIG. 3-*b*, in a possible implementation, after stepping down the brake pedal 7, a driver may obtain a target braking force based on a pedal travel signal collected by the pedal travel sensor PTS. Based on the target braking force, the brake system controls a related control valve to provide corresponding braking pressure to a brake wheel cylinder.

Specifically, as shown in FIG. 3-*a* and FIG. 3-*b*, a connection relationship between the master cylinder and brake wheel cylinders may be described as follows: The first main cavity of the master cylinder 1 is separately connected to a first wheel cylinder pressurization valve 31 and a second wheel cylinder pressurization valve 32 through the first master cylinder isolation valve 11. The first wheel cylinder pressurization valve 31 is connected to a first wheel cylinder 3*a*, and the second pressurization valve 32 is connected to a second wheel cylinder 3*b*. The second main cavity of the master cylinder 1 is separately connected to a third wheel cylinder pressurization valve 33 and a fourth wheel cylinder pressurization valve 34 through the second master cylinder isolation valve 12. The third wheel cylinder pressurization valve 33 is connected to a third wheel cylinder 3*c*, and the fourth wheel cylinder pressurization valve 34 is connected to a fourth wheel cylinder 3*d*.

Optionally, in Embodiment 1, the master cylinder isolation valve 11 and the master cylinder isolation valve 12 are normal open valves.

Optionally, in Embodiment 1, the booster 2 includes a six-phase motor 201.

It should be noted that in the brake system provided in some embodiments of this application, the six-phase motor 201 may alternatively be replaced with another type of motor, for example, a three-phase permanent magnet synchronous motor. In Embodiment 1, using the six-phase motor 201 may help improve a control redundancy degree of the system.

Optionally, in Embodiment 1, the six-phase motor 201 may further include a motor position sensor (MPS). The motor position sensor MPS is configured to obtain a motor position signal, to implement motor control or improve motor control precision.

Specifically, as shown in FIG. 3-*a* and FIG. 3-*b*, the six-phase motor 201 includes a first winding and a second winding. The first winding is configured to be controlled by the first control unit 91, and the second winding is configured to be controlled by the second control unit 92. It should be understood that the six-phase motor 201 may alternatively use another redundancy control manner. For example, the first control unit 91 and the second control unit 92 simultaneously control all windings of the six-phase motor 201, and the first control unit 91 and the second control unit 92 may be mutually redundant. For another example, the first control unit 91 and the second control unit 92 may separately provide a specific percentage of control drive signals. For example, the first control unit 91 generates 50% of control signals, and the second control unit 92 generates 50% of the control signals, to ensure that the six-phase motor 201 can still perform a specific action when any controller is faulty.

Optionally, in Embodiment 1, the booster 2 includes a dual apply plunger (DAP) 202, and the dual apply plunger 202 includes a first booster cavity and a second booster cavity. The first booster cavity is connected to a first booster branch, and the second booster cavity is connected to a second booster branch.

It should be noted that, the dual apply plunger 202 can enable a pressurization process continuous and stable, and bring a good pressurization feature to the brake system.

Specifically, as shown in FIG. 3-*a* and FIG. 3-*b*, a connection relationship between the dual apply plunger of the booster 2 and the brake wheel cylinder may be described as follows: The first booster cavity is separately connected to the first wheel cylinder pressurization valve 31 and the second wheel cylinder pressurization valve 32 through a first booster control valve 21 on the first booster branch. The first wheel cylinder pressurization valve 31 is connected to the first wheel cylinder 3*a*, and the second wheel cylinder pressurization valve 32 is connected to the second wheel cylinder 3*b*. In addition, the first booster cavity is separately connected to the third wheel cylinder pressurization valve 33 and the fourth wheel cylinder pressurization valve 34 through a second booster control valve 22 on the first booster branch. The third wheel cylinder pressurization valve 33 is connected to the third wheel cylinder 3*c*, and the fourth wheel cylinder pressurization valve 34 is connected to the fourth wheel cylinder 3*d*. Similarly, the second booster cavity is separately connected to the first wheel cylinder pressurization valve 31 and the second wheel cylinder pressurization valve 32 through a third booster control valve 23 on the second booster branch. The first wheel cylinder pressurization valve 31 is connected to the first wheel cylinder 3*a*, and the second pressurization valve 32 is connected to the second wheel cylinder 3*b*. In addition, the second booster cavity is separately connected to the third wheel cylinder pressurization valve 33 and the fourth wheel cylinder pressurization valve 34 through a fourth booster control valve 24 on the second booster branch. The third wheel cylinder pressurization valve 33 is connected to the third wheel cylinder 3*c*, and the fourth wheel cylinder pressurization valve 34 is connected to the fourth wheel cylinder 3*d*.

Optionally, the first booster control valve 21, the second booster control valve 22, the third booster control valve 23, and the fourth booster control valve 24 are normal closed valves.

Optionally, in Embodiment 1, the brake system may further include a brake fluid reservoir 5.

As shown in FIG. 3-*a* and FIG. 3-*b*, the first main cavity of the master cylinder 1 is connected to the brake fluid reservoir 5 through a first fluid storage pipe, the second main cavity of the master cylinder 1 is connected to the brake fluid reservoir 5 through the test simulation valve 51, the first booster cavity of the booster 2 is connected to the fluid storage apparatus 5 through a second fluid storage pipe, the second booster cavity of the booster 2 is connected to the brake fluid reservoir 5 through a one-way valve, first ends of the depressurization valves (41, 42, 43, and 44) are connected to the brake fluid reservoir 5 through a third fluid storage pipe, and second ends of the depressurization valves (41, 42, 43, and 44) are configured to be separately connected to a brake wheel cylinder 4.

Optionally, in Embodiment 1, the brake system may further include a reservoir level sensor (RLS). As shown in FIG. 3-*a* and FIG. 3-*b*, the reservoir level sensor RLS may be disposed in the brake fluid reservoir 5, and is configured to detect a fluid level of hydraulic oil in the brake fluid reservoir.

Optionally, in Embodiment 1, the brake system may further include a pedal feeling simulator 6 and a pedal simulation valve 61.

As shown in FIG. 3-*a* and FIG. 3-*b*, the pedal feeling simulator 6 is connected to the second main cavity of the master cylinder 1 through the pedal simulation valve 61. The pedal simulation valve 61 is further connected to the second main cavity of the master cylinder 1 through a one-way valve. Between the pedal feeling simulator 6 and the second main cavity, the pedal simulation valve 61 and the one-way valve are in a parallel relationship.

Optionally, in Embodiment 1, the brake system may further include a master cylinder pressure sensor (MCPS). As shown in FIG. 3-*a* and FIG. 3-*b*, the master cylinder pressure sensor MCPS is connected to the second main cavity of the master cylinder.

Optionally, in Embodiment 1, the brake system may further include a brake circuit pressure sensor (BCPS). In a possible implementation, as shown in FIG. 3-*a* and FIG. 3-*b*, a connection point between the brake circuit pressure sensor BCPS and a brake circuit is located on a pipe between the first wheel cylinder pressurization valve 31 and the second wheel cylinder pressurization valve 32. It may be understood herein that a connection position of the brake circuit pressure sensor BCPS in the brake circuit is not limited to a connection position shown in FIG. 3-*a* and FIG. 3-*b*, and the connection position may alternatively be disposed on a pipe between the third wheel cylinder pressurization valve 33 and the fourth wheel cylinder pressurization valve 34. A specific connection position of the BCPS is not limited in this application.

It should be noted that, when the brake circuit pressure sensor BCPS is disposed on the pipe between the first wheel cylinder pressurization valve 31 and the second wheel cylinder pressurization valve 32, or is disposed on the pipe between the third wheel cylinder pressurization valve 33 and the fourth wheel cylinder pressurization valve 34, the brake circuit pressure sensor BCPS can obtain oil pressure of the first booster cavity and the second booster cavity.

Optionally, in Embodiment 1, a one-way valve may be further included.

Optionally, as shown in FIG. 3-*a* and FIG. 3-*b*, two ends of each of the cylinder pressurization valves (31, 32, 33, and 34) may be connected in parallel to a one-way valve, and the one-way valve connected in parallel to the two ends of each of the cylinder pressurization valves (31, 32, 33, and 34) is configured to allow brake fluid to flow from the brake wheel cylinder to the brake circuit through the one-way valve. Optionally, as shown in FIG. 3-*a* and FIG. 3-*b*, two ends of the test simulation valve (51) may be connected in parallel to a one-way valve, and the one-way valve connected in parallel to the two ends of the test simulation valve (51) is configured to allow the brake fluid to flow from the brake fluid reservoir 5 to the master cylinder 1 through the one-way valve. Two ends of the pedal simulation valve 61 may also be connected in parallel to a one-way valve, and the one-way valve connected in parallel to the two ends of the pedal simulation valve 61 is configured to allow the brake fluid to flow from a pedal simulator to the master cylinder 1 through the one-way valve. The booster 2 is connected to the brake fluid reservoir 5 through a one-way valve, and the one-way valve is configured to allow the brake fluid to flow from the brake fluid reservoir 5 to the booster 2 through the one-way valve.

It should be noted that, leakage may exist in the master cylinder 1 or the booster 2. When a solenoid valve is stuck or another fault occurs, fluid may be replenished to the master cylinder 1 or the booster 2 through the one-way valve. In a possible implementation, the one-way valve may be a solenoid valve of a type similar to a cylinder pressurization valve.

Optionally, in Embodiment 1, as shown in FIG. 3-*a* and FIG. 3-*b*, the brake system may further include a filter. The filter may filter impurities in a hydraulic circuit.

In Embodiment 1, objects controlled by the first control unit 91 and the second control unit 92 are separately as follows:

(1) The objects controlled by the first control unit 91 include: the six-phase motor 201, the first master cylinder isolation valve 11, the second master cylinder isolation valve 12, the first booster control valve 21, the second booster control valve 22, the third booster control valve 23, the fourth booster control valve 24, the first wheel cylinder pressurization valve 31, the second wheel cylinder pressurization valve 32, the third wheel cylinder pressurization valve 33, the fourth wheel cylinder pressurization valve 34, a first wheel cylinder depressurization valve 41, a second wheel cylinder depressurization valve 42, a third wheel cylinder depressurization valve 43, a fourth wheel cylinder depressurization valve 44, the test simulation valve 51, and the pedal simulation valve 61.

(2) The objects controlled by the second control unit 92 include: the six-phase motor 201, the first master cylinder isolation valve 11, the second master cylinder isolation valve 12, the first booster control valve 21, the second booster control valve 22, the third booster control valve 23, the fourth booster control valve 24, and the pedal simulation valve 61.

Optionally, in Embodiment 1, the first control unit 91 and the second control unit may be integrated in a same controller, or may be independent of each other. In a possible implementation, a controller of a linear brake system includes the first control unit 91 and the second control unit

92, and the controller further includes at least various solenoid valve drives and motor drives and various output interfaces for signal processing and control. The controller receives, from various sensors, measurement or detection signals, such as an environment condition, a driver input, and a brake system status; and controls brake features of the brake system through calculation and determining.

It should be noted that the brake system provided in Embodiment 1 of this application has a plurality of integration manners. The following describes the plurality of integration manners of the brake system provided in Embodiment 1 of this application with reference to FIG. 3-*a* and FIG. 3-*b*.

(1) Integration solution 1: As shown in FIG. 3-*a*, the brake system includes components in a range shown in a dashed box, and specifically includes: the first control unit 91, the second control unit 92, the master cylinder 1, the six-phase motor 201, the dual apply plunger 202, the brake fluid reservoir 5, the pedal feeling simulator 6, the first master cylinder isolation valve 11, the second master cylinder isolation valve 12, the first booster control valve 21, the second booster control valve 22, the third booster control valve 23, the fourth booster control valve 24, the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, the fourth wheel cylinder depressurization valve 44, the test simulation valve 51, the pedal simulation valve 61, the pedal travel sensor (PTS), the master cylinder pressure sensor (MCPS), and the brake circuit pressure sensor (BCPS).

It should be noted that the integration solution 1 may further include one or more of components such as a one-way valve, a filter, and a master cylinder push rod. All components included in the integration solution 1 may be integrated, and a connection relationship between each component and each pipe is shown in FIG. 3-*a*. A control relationship between the components is described in Embodiment 1.

It should be noted that the brake system provided in the integration solution 1 does not include the brake pedal 7, but may include the master cylinder push rod. When the brake system in the integration solution 1 is selected, different types of brake pedals 7 may be used to adapt to more vehicle models and provide more personalized matching possibilities. In addition, when a sales form of the brake system is the integration solution 1, the brake system does not include a wheel cylinder, but has at least one wheel cylinder interface 4. The at least one wheel cylinder interface 4 is configured to be connected to at least one wheel cylinder, and may provide braking pressure for the wheel cylinder. The brake system shown in FIG. 3-*a* includes four wheel cylinder interfaces, and the wheel cylinder interfaces may be connected to four wheel cylinders in a one-to-one correspondence.

(2) Integration solution 2: As shown in FIG. 3-*b*, the brake system includes components in a range shown in a dashed box, and specifically includes: the first control unit 91, the second control unit 92, the master cylinder 1, the six-phase motor 201, the dual apply plunger 202, the pedal feeling simulator 6, the first master cylinder isolation valve 11, the second master cylinder isolation valve 12, the first booster control valve 21, the second booster control valve 22, the third booster control valve 23, the fourth booster control valve 24, the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, the fourth wheel cylinder depressurization valve 44, the test simulation valve 51, the pedal simulation valve 61, the pedal travel sensor PTS, the master cylinder pressure sensor MCPS, and the brake circuit pressure sensor BCPS.

Compared with the integration solution 1, the integration solution 2 differs in that the brake fluid reservoir 5 is not included. Correspondingly, in the brake system in the integration solution 2, at least one interface 8 configured to be connected to the brake fluid reservoir 5 is added, as shown by an interface 8*a*, an interface 8*b*, an interface 8*c*, and an interface 8*d* in FIG. 3-*b*. It should be noted that a quantity of interfaces 8 may be adjusted based on an actual requirement. For example, in a possible implementation, the interface 8*a* and the interface 8*b* may be combined into a same interface in a brake apparatus.

The foregoing describes the system composition, the connection relationship, the control relationship, the integration manner, and the like of the brake system provided in Embodiment 1 with reference to FIG. 3-*a* and FIG. 3-*b*. The following describes a plurality of working modes of the brake system provided in Embodiment 1 with reference to FIG. 4 to FIG. 6.

The brake system provided in Embodiment 1 of this application includes at least three working modes: (1) An ECU 1 and an ECU 2 work cooperatively; (2) an ECU 1 works independently; or (3) an ECU 2 works independently.

Working mode 1: The ECU 1 and the ECU 2 work cooperatively.

Figure 4:
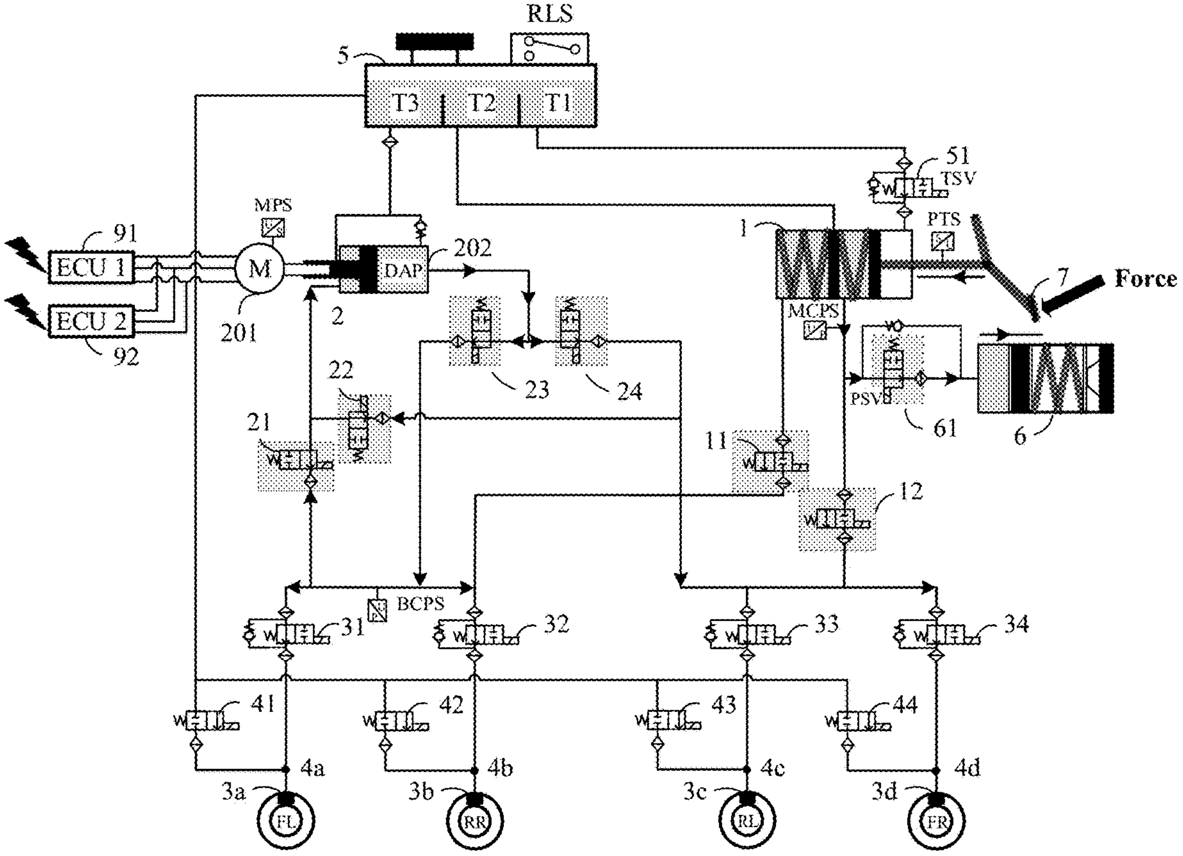
FIG. 4 is a schematic diagram of a working mode of a brake system according to an embodiment of this application.

FIG. 4 is a schematic diagram of a working mode of the brake system according to Embodiment 1 of this application. FIG. 4 shows a state in which the ECU 1 and the ECU 2 work cooperatively when the brake system is not faulty. In this case, the ECU 1 controls driving of three phases of a six-phase motor M, the ECU 2 controls driving of other three phases of the six-phase motor M, and the ECU 1 and the ECU 2 jointly drive the motor M to push an electric cylinder DAP, to implement quick system pressure establishment. The ECU 1 controls all solenoid valves, calculates control signals of the motor and the solenoid valves based on a sensor signal, and sends the control signal of the motor M to the ECU 2. The two ECUs work cooperatively to implement wheel pressure control, thereby implementing functions such as ABS/TCS/ESC/BBF/AEB/ACC.

Working mode 2: The ECU 1 works independently.

Figure 5:
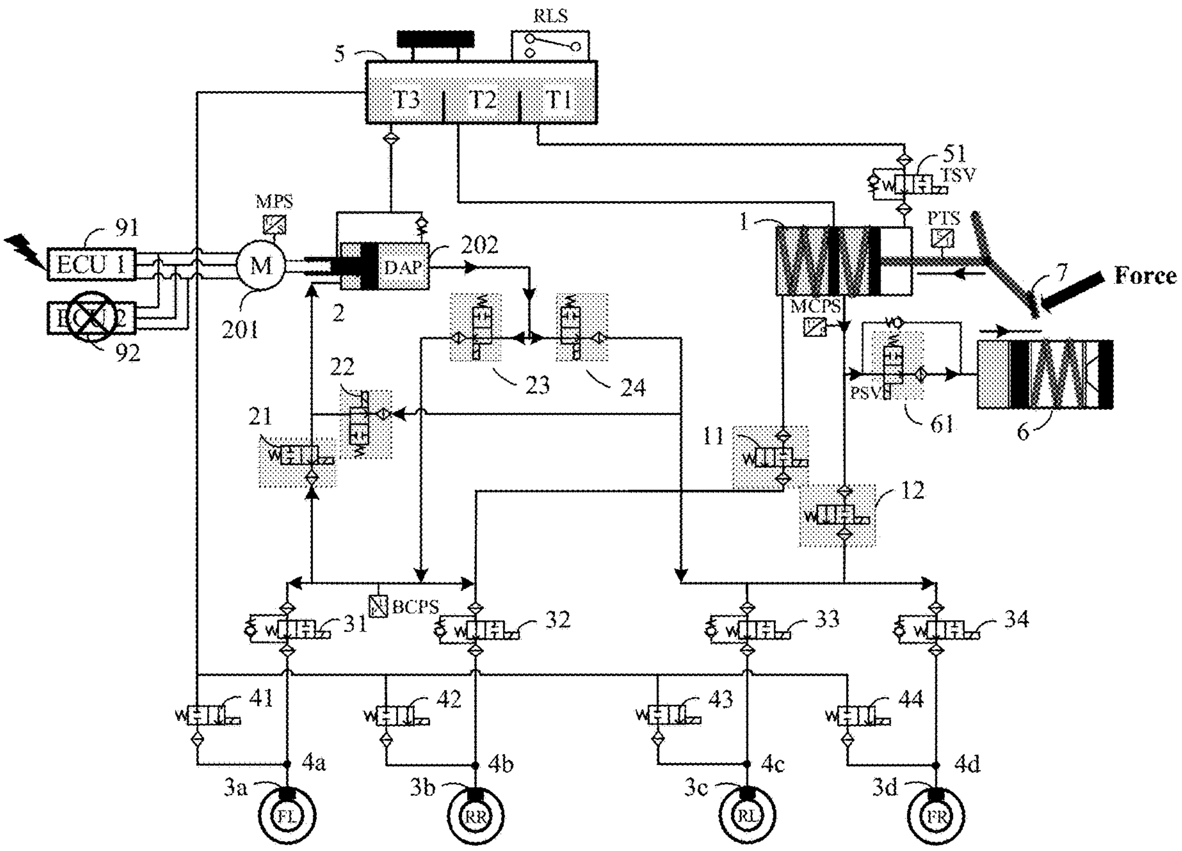
FIG. 5 is a schematic diagram of another working mode of a brake system according to an embodiment of this application.

FIG. 5 is a schematic diagram of another working mode of the brake system according to Embodiment 1 of this application. FIG. 5 shows a state in which the ECU 1 works independently when the ECU 2 is faulty. In this case, the ECU 1 controls driving of three phases of a six-phase motor M to push an electric cylinder DAP, to implement system pressure establishment. The ECU 1 controls all solenoid valves, and calculates control signals of the motor and the solenoid valves based on a sensor signal, to implement wheel pressure control, thereby implementing vehicle control functions such as ABS/TCS/ESC/BBF/AEB/ACC.

Working mode 3: The ECU 2 works independently.

Figure 6:
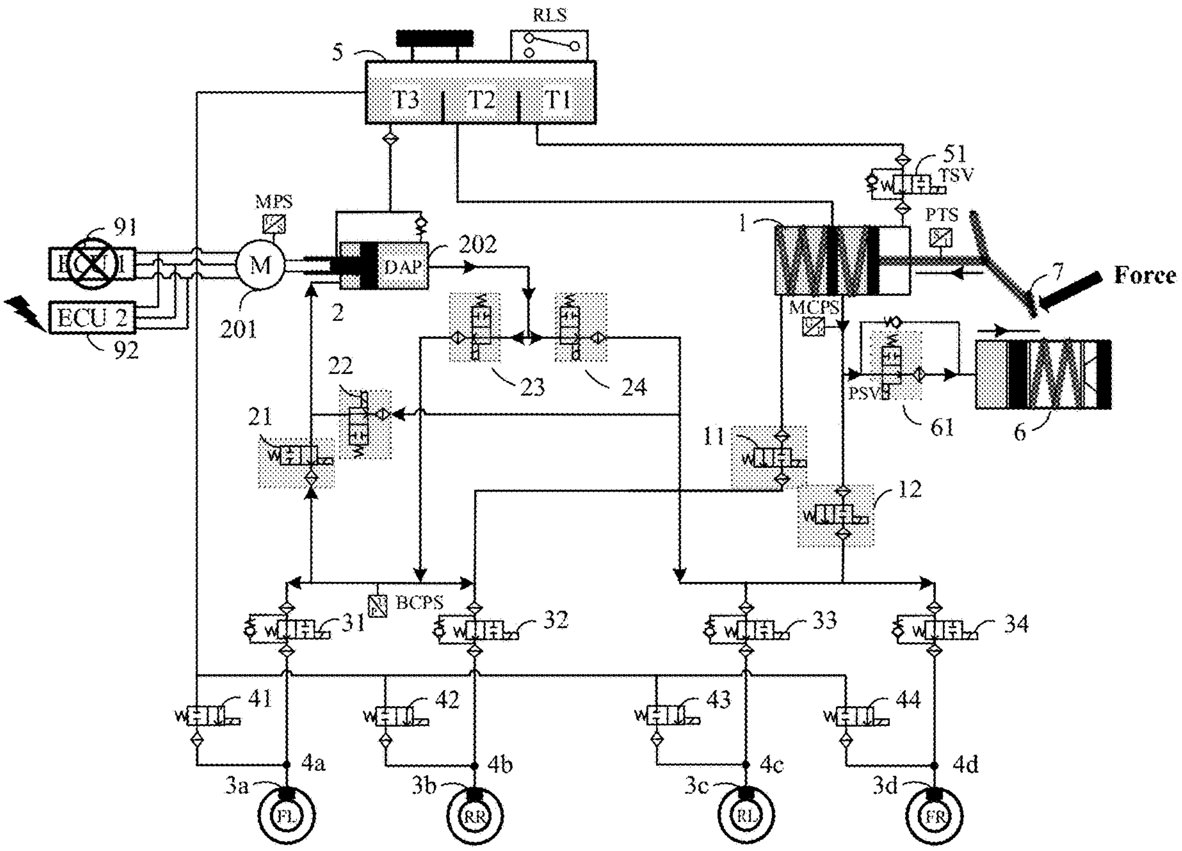
FIG. 6 is a schematic diagram of another working mode of a brake system according to an embodiment of this application.

FIG. 6 is a schematic diagram of another working mode of the brake system according to Embodiment 1 of this application. FIG. 6 shows a state in which the ECU 2 works independently when the ECU 1 is faulty. In this case, the ECU 2 controls driving of three phases of a six-phase motor M to push an electric cylinder DAP, to implement system pressure establishment. The ECU 2 controls the first master cylinder isolation valve 11, the second master cylinder isolation valve 12, the first booster control valve 21, the second booster control valve 22, the third booster control valve 23, the fourth booster control valve 24, and the pedal simulation valve 61; and calculates control signals of the motor M and the solenoid valves based on a sensor signal, to implement wheel pressure control. Because the ECU 2 cannot control the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, and the fourth wheel cylinder depressurization valve 44, only vehicle control functions such as BBF/AEB/ACC can be implemented in this working mode.

Embodiment 2

Figure 7:
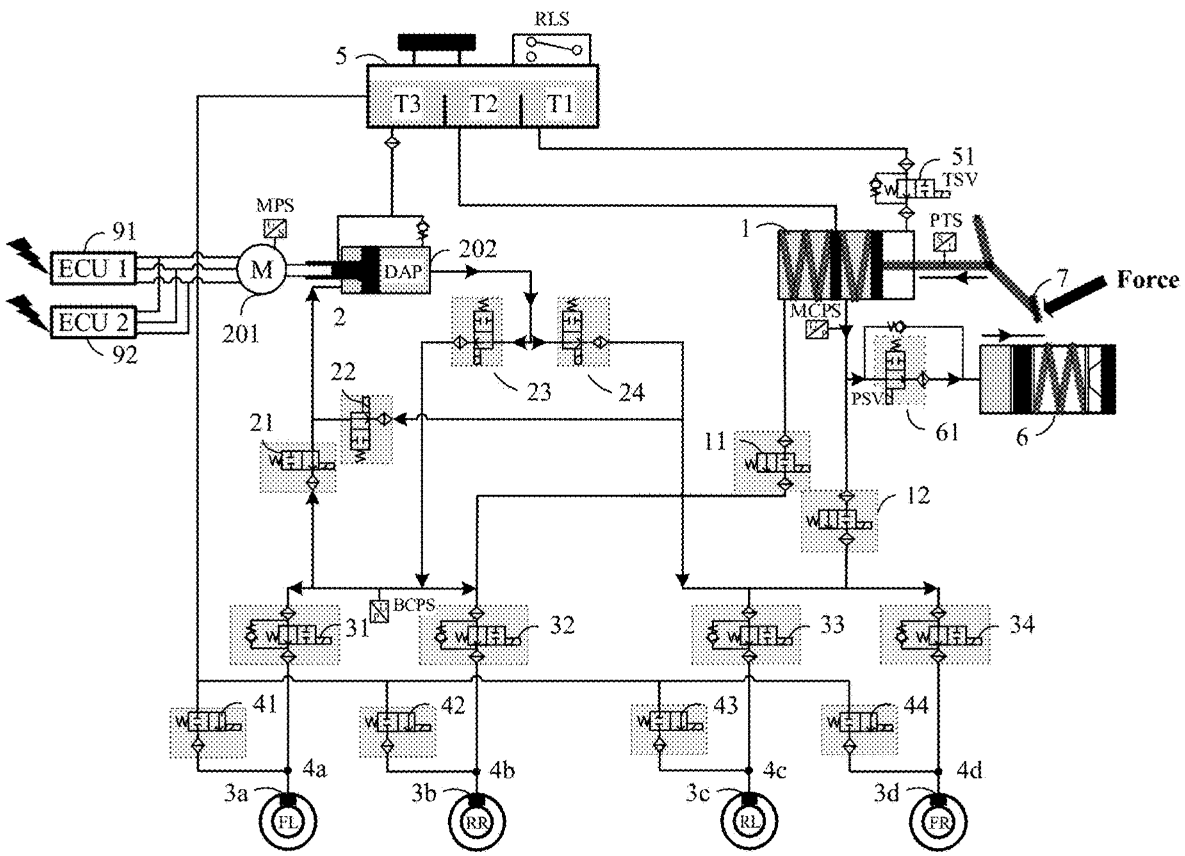
FIG. 7 is a schematic diagram of a working mode of another brake system according to an embodiment of this application.
Figure 8:
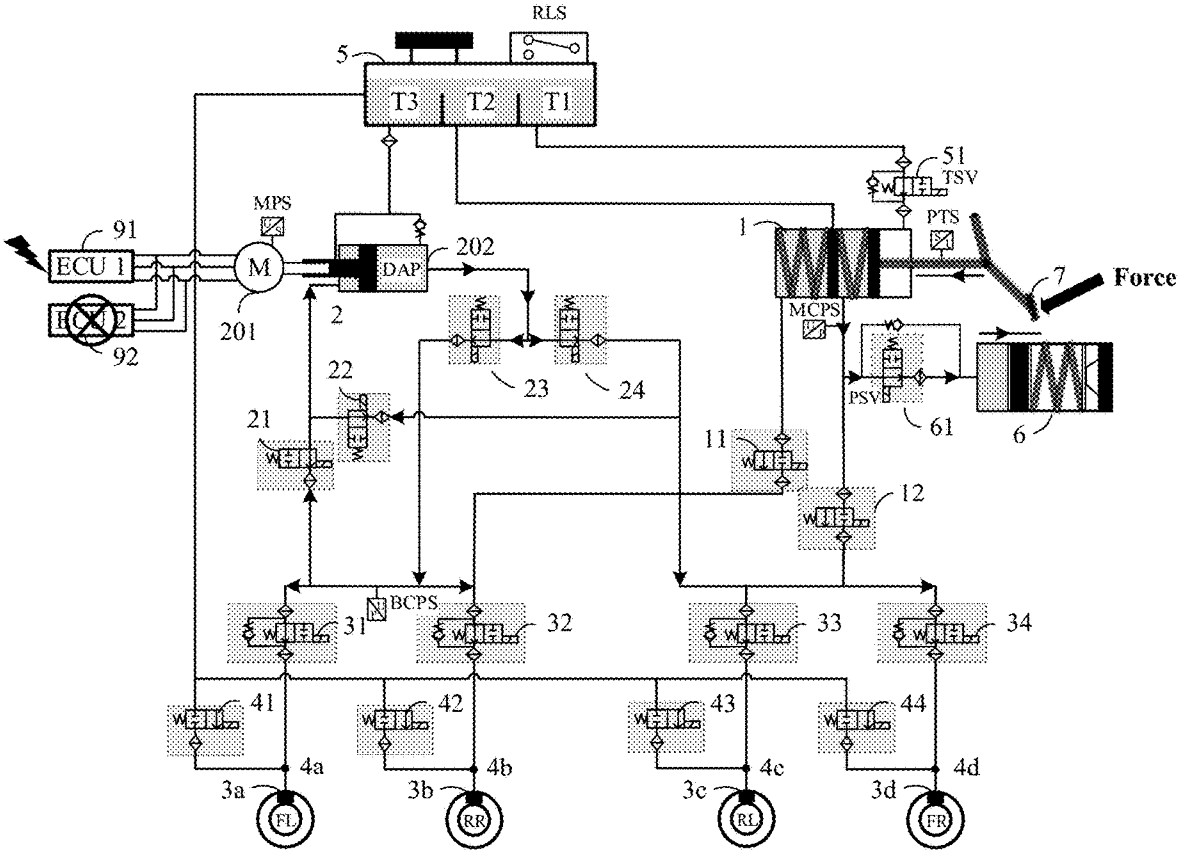
FIG. 8 is a schematic diagram of another working mode of another brake system according to an embodiment of this application.
Figure 9:
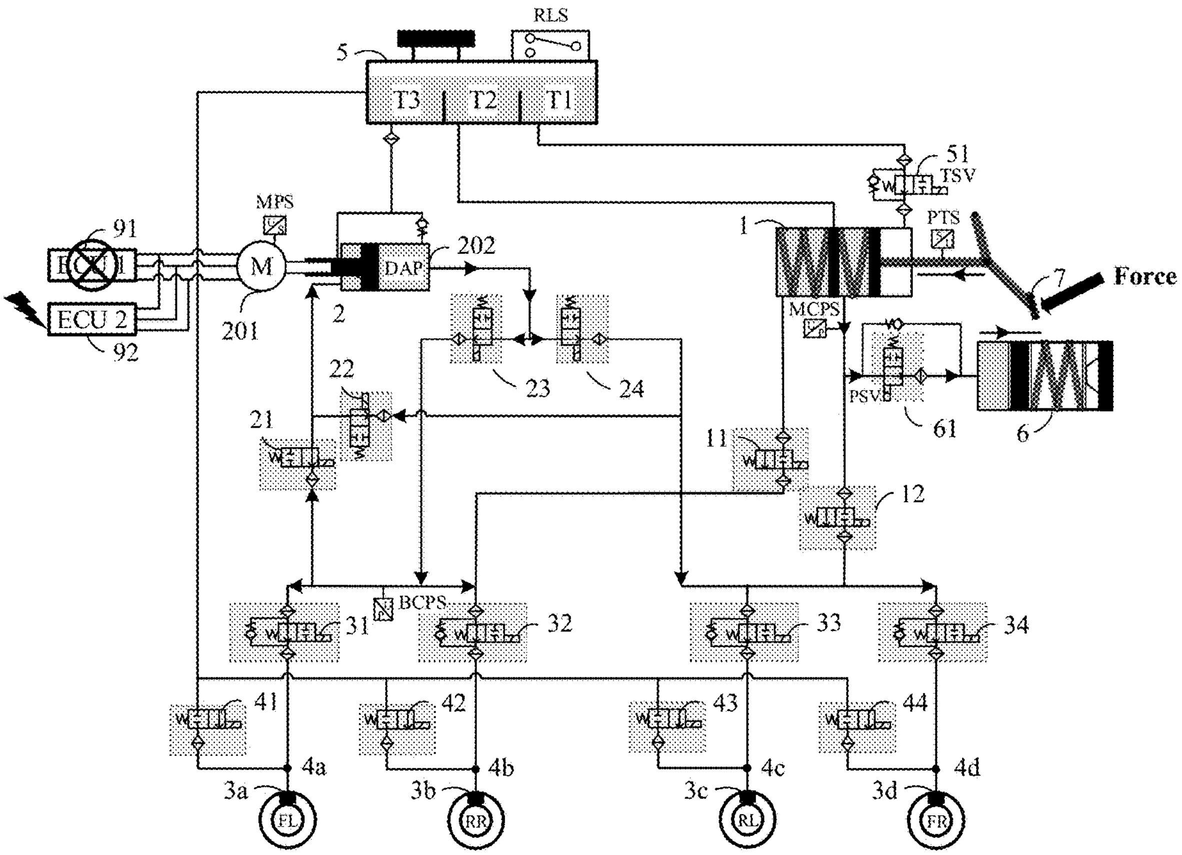
FIG. 9 is a schematic diagram of another working mode of another brake system according to an embodiment of this application.

Embodiment 2 of this application also provides a brake system. FIG. 7 to FIG. 9 are schematic diagrams of different working states of another brake system according to Embodiment 2 of this application. As shown in FIG. 7 to FIG. 9, for the brake system provided in Embodiment 2 of this application in terms of system composition, a connection relationship, an integration manner, and the like, refer to the description in Embodiment 1. Details are not described herein again. A difference between the brake system provided in Embodiment 2 of this application and the brake system provided in Embodiment 1 of this application lies in a redundancy design of a control unit.

Specifically, in Embodiment 2, objects controlled by a first control unit 91 and a second control unit 92 are separately as follows:

(1) The objects controlled by the first control unit 91 include: a six-phase motor 201, a first master cylinder isolation valve 11, a second master cylinder isolation valve 12, a first booster control valve 21, a second booster control valve 22, a third booster control valve 23, a fourth booster control valve 24, a first wheel cylinder pressurization valve 31, a second wheel cylinder pressurization valve 32, a third wheel cylinder pressurization valve 33, a fourth wheel cylinder pressurization valve 34, a first wheel cylinder depressurization valve 41, a second wheel cylinder depressurization valve 42, a third wheel cylinder depressurization valve 43, a fourth wheel cylinder depressurization valve 44, a test simulation valve 51, and a pedal simulation valve 61.

(2) The objects controlled by the second control unit 92 include: the six-phase motor 201, the first master cylinder isolation valve 11, the second master cylinder isolation valve 12, the first booster control valve 21, the second booster control valve 22, the third booster control valve 23, the fourth booster control valve 24, the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, the fourth wheel cylinder depressurization valve 44, and the pedal simulation valve 61.

It should be noted that, compared with that in the brake system provided in Embodiment 1, in the brake system provided in Embodiment 2 of this application, the second control unit 91 may further control the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, and the fourth wheel cylinder depressurization valve 44. In the brake system provided in Embodiment 2 of this application, in addition to a fifth control valve (51), the second control unit 92 further performs redundancy backup on other control valves controlled by the first control unit 91, thereby improving a redundancy degree of brake system control.

The foregoing describes the composition, the connection relationship, the control relationship, and the integration manner of the brake system provided in Embodiment 2 of this application. The following describes a plurality of working modes of the brake system provided in Embodiment 2 of this application with reference to FIG. 7 to FIG. 9.

The brake system provided in Embodiment 2 of this application includes at least three working modes: (1) An ECU 1 and an ECU 2 work cooperatively; (2) an ECU 1 works independently; or (3) an ECU 2 works independently.

Working mode 1: The ECU 1 and the ECU 2 work cooperatively.

FIG. 7 is a schematic diagram of a working mode of the brake system according to Embodiment 2 of this application. FIG. 7 shows a state in which the ECU 1 and the ECU 2 work cooperatively when the system is not faulty. In this case, the ECU 1 controls driving of three phases of a six-phase motor M, the ECU 2 controls driving of other three phases of the six-phase motor M, and the ECU 1 and the ECU 2 jointly drive the motor M to push an electric cylinder DAP, to implement quick system pressure establishment. The ECU 1 controls all solenoid valves, calculates control signals of the motor and the solenoid valves based on a sensor signal, and sends the control signal of the motor M to the ECU 2. The ECU 1 and the ECU 2 work cooperatively to implement wheel pressure control, thereby implementing functions such as ABS/TCS/ESC/BBF/AEB/ACC.

Working mode 2: The ECU 1 works independently.

FIG. 8 is a schematic diagram of another working mode of the brake system according to Embodiment 2 of this application. FIG. 8 shows a state in which the ECU 1 works independently when the ECU 2 is faulty. In this case, the ECU 1 controls driving of three phases of a six-phase motor M to push an electric cylinder DAP, to implement system pressure establishment. The ECU 1 controls all solenoid valves, and calculates control signals of the motor and the solenoid valves based on a sensor signal, to implement wheel pressure control, thereby implementing vehicle control functions such as ABS/TCS/ESC/BBF/AEB/ACC.

Working mode 3: The ECU 2 works independently.

FIG. 9 is a schematic diagram of another working mode of the brake system according to Embodiment 2 of this application. FIG. 9 shows a state in which the ECU 2 works independently when the ECU 1 is faulty. In this case, the ECU 2 controls driving of three phases of a six-phase motor M to push an electric cylinder DAP, to implement system pressure establishment. The ECU 2 controls all solenoid valves except the test simulation valve TSV, and calculates control signals of the motor and the solenoid valves based on a sensor signal, to implement wheel pressure control, thereby implementing vehicle control functions such as ABS/TCS/ESC/BBF/AEB/ACC.

Embodiment 3

Figure 11:
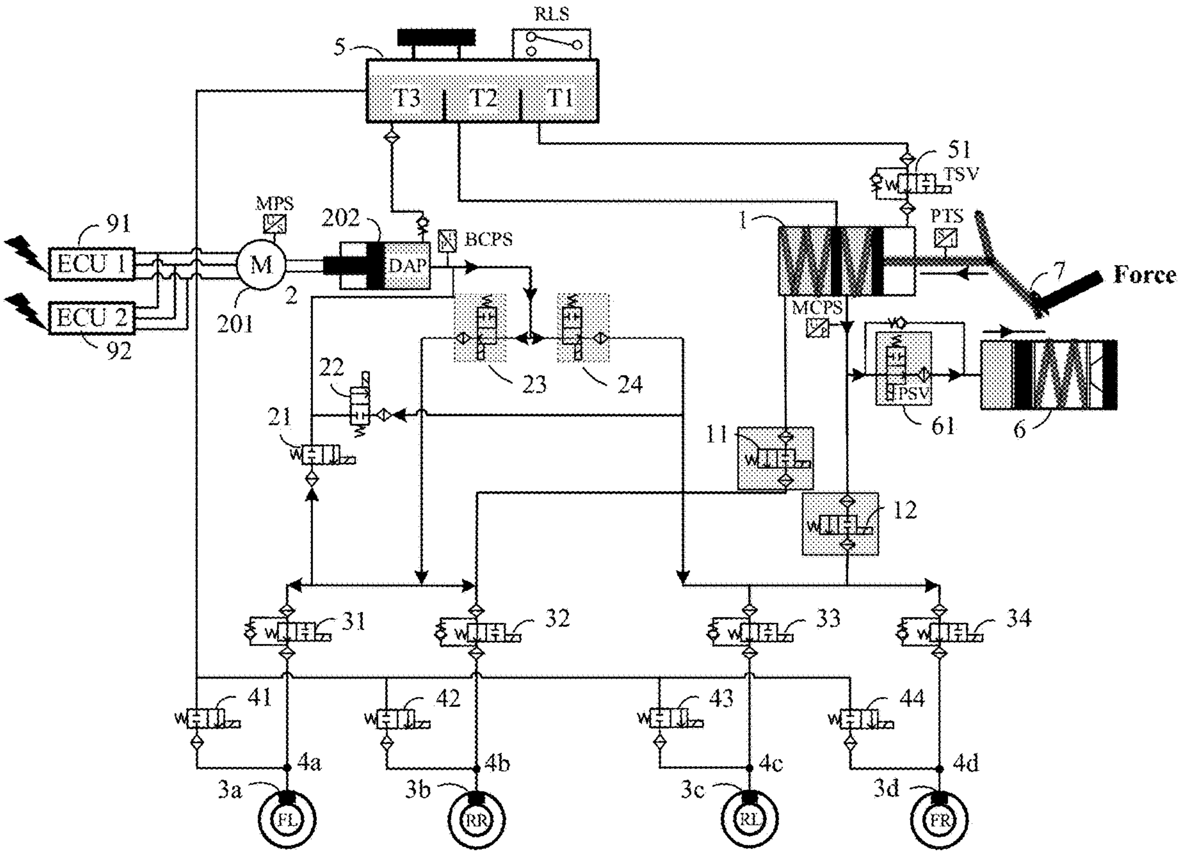
FIG. 11 is a schematic diagram of a working mode of another brake system according to an embodiment of this application.
Figure 12:
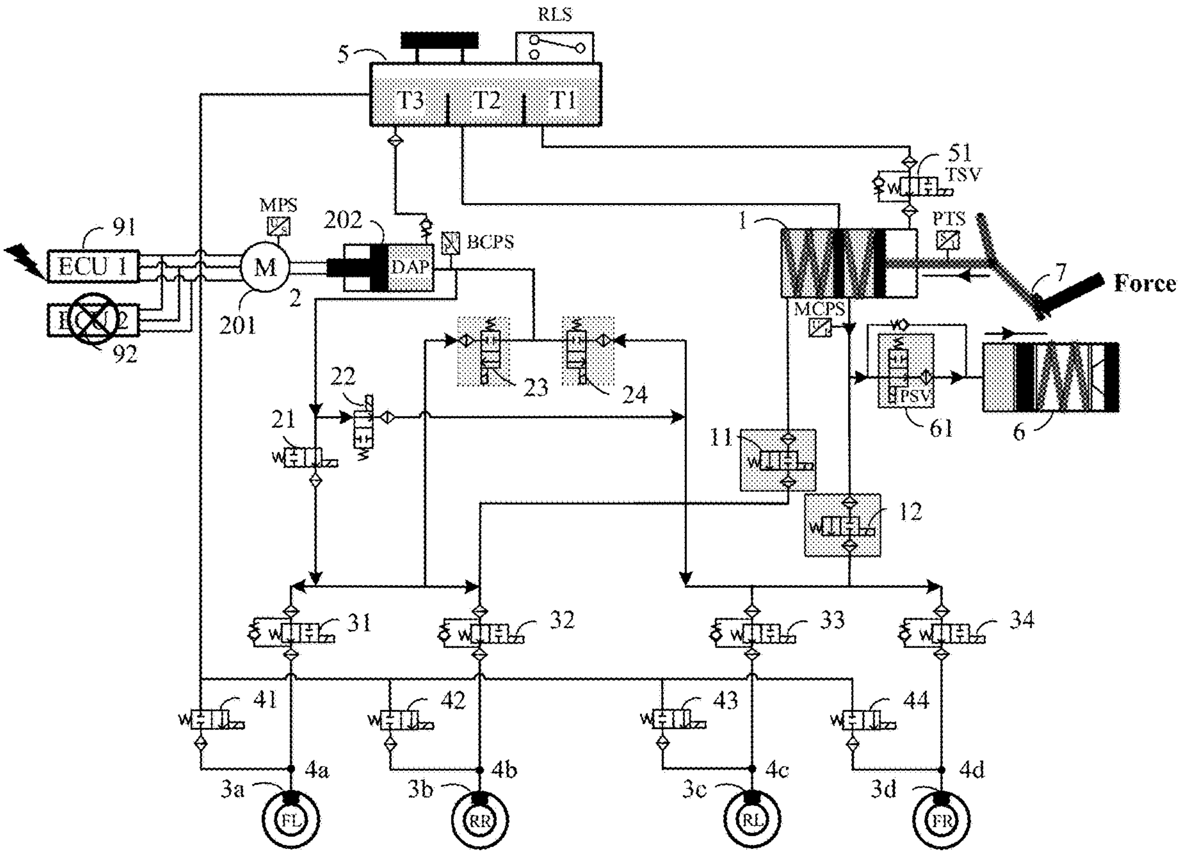
FIG. 12 is a schematic diagram of another working mode of another brake system according to an embodiment of this application.
Figure 13:
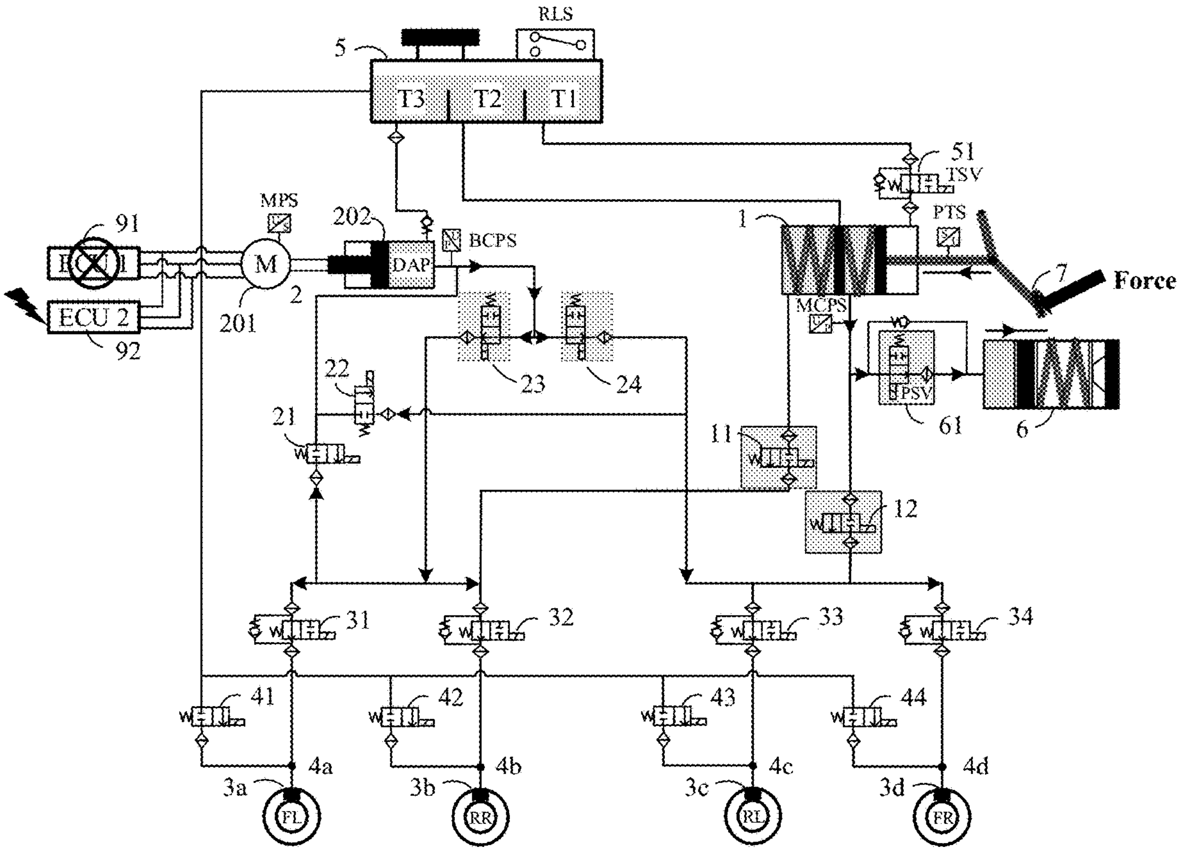
FIG. 13 is a schematic diagram of another working mode of another brake system according to an embodiment of this application.

FIG. 10-*a* and FIG. 10-*b* each show a brake system according to Embodiment 3 of this application. FIG. 11 to FIG. 13 are schematic diagrams of different working states of another brake system according to Embodiment 3 of this application.

The following describes the brake system provided in Embodiment 3 of this application with reference to FIG. 10-*a* to FIG. 13.

As shown in FIG. 10-*a* to FIG. 13, the brake system provided in Embodiment 3 of this application differs from that in Embodiment 1 in terms of system composition, a connection relationship, a control relationship, an integration manner, and the like.

First, in terms of the system composition and the connection relationship, as shown in FIG. 10-*a* to FIG. 13, a difference from the brake system provided in Embodiment 1 or Embodiment 2 includes: In the brake system provided in Embodiment 3 of this application, a booster 2 uses a single apply plunger. The single apply plunger is separately connected to a first booster branch and a second booster branch. In addition, the single apply plunger of the booster 2 is connected to a fluid storage apparatus 5 through a one-way valve. In addition, a disposed position of a brake circuit pressure sensor BCPS is also different.

Specifically, in Embodiment 3, a connection relationship between the single apply plunger of the booster 2 and brake wheel cylinders may be described as follows: The single apply plunger is separately connected to a first wheel cylinder pressurization valve 31 and a second wheel cylinder pressurization valve 32 through a first booster control valve 21 on the first booster branch. The first wheel cylinder pressurization valve 31 is connected to a first wheel cylinder 3*a*, and the second pressurization valve 32 is connected to a second wheel cylinder 3*b*. In addition, the single apply plunger is separately connected to a third wheel cylinder pressurization valve 33 and a fourth wheel cylinder pressurization valve 34 through a second booster control valve 22 on the first booster branch. The third wheel cylinder pressurization valve 33 is connected to a third wheel cylinder 3*c*, and the fourth wheel cylinder pressurization valve 34 is connected to a fourth wheel cylinder 3*d*. Similarly, the single apply plunger is separately connected to the first wheel cylinder pressurization valve 31 and the second wheel cylinder pressurization valve 32 through a third booster control valve 23 on the second booster branch. The first wheel cylinder pressurization valve 31 is connected to the first wheel cylinder 3*a*, and the second pressurization valve 32 is connected to the second wheel cylinder 3*b*. In addition, the single apply plunger is separately connected to the third wheel cylinder pressurization valve 33 and the fourth wheel cylinder pressurization valve 34 through a fourth booster control valve 24 on the second booster branch. The third wheel cylinder pressurization valve 33 is connected to the third wheel cylinder 3*c*, and the fourth wheel cylinder pressurization valve 34 is connected to the fourth wheel cylinder 3*d*.

Specifically, in Embodiment 3, the brake circuit pressure sensor BCPS of the booster 2 is disposed between the second control valves (21, 22, 23, and 24) and the single apply plunger of the booster 2, for example, may be disposed between the first booster control valve 21 and the single apply plunger 202. An appropriate position is selected, so that the brake circuit pressure sensor BCPS can obtain oil pressure output by the single apply plunger of the booster 2 to a brake circuit in different working modes.

Second, in terms of the control relationship, in Embodiment 3, objects controlled by a first control unit 91 and a second control unit 92 are separately as follows:

(1) The objects controlled by the first control unit 91 include: a six-phase motor 201, a first master cylinder isolation valve 11, a second master cylinder isolation valve 12, the first booster control valve 21, the second booster control valve 22, the first wheel cylinder pressurization valve 31, the second wheel cylinder pressurization valve 32, the third wheel cylinder pressurization valve 33, the fourth wheel cylinder pressurization valve 34, a first wheel cylinder depressurization valve 41, a second wheel cylinder depressurization valve 42, a third wheel cylinder depressurization valve 43, a fourth wheel cylinder depressurization valve 44, a test simulation valve 51, and a pedal simulation valve 61.

(2) The objects controlled by the second control unit 92 include: the six-phase motor 201, the first master cylinder isolation valve 11, the second master cylinder isolation valve 12, the third booster control valve 23, the fourth booster control valve 24, and the pedal simulation valve 61.

For the control valves in the brake system provided in Embodiment 3, the third booster control valve 23 and the fourth booster control valve 24 are independently controlled by the second control unit 92, as shown by a range covered by a dashed box in FIG. 10-*a*. The first master cylinder isolation valve 11, the second master cylinder isolation valve 12, and the pedal simulation valve 61 are jointly controlled by the first control unit 91 and the second control unit 92, as shown by a range covered by a solid box in FIG. 10-*a*.

Third, in terms of the integration manner, the integration manner of the brake system provided in Embodiment 3 is different from that in Embodiment 1. This is mainly because the booster 2 of the brake system provided in Embodiment 3 uses the single apply plunger, and the system composition and the connection relationship are adaptively adjusted. The following describes a plurality of integration manners of the brake system provided in Embodiment 3 of this application with reference to FIG. 10-*a* to FIG. 13.

(1) Integration solution 3: As shown in FIG. 10-*b*, the brake system includes components in a range shown in a dashed box, and specifically includes: the first control unit 91, the second control unit 92, a master cylinder 1, the six-phase motor 201, the single apply plunger 202, the brake fluid reservoir 5, a pedal feeling simulator 6, the first master cylinder isolation valve 11, the second master cylinder isolation valve 12, the first booster control valve 21, the second booster control valve 22, the third booster control valve 23, the fourth booster control valve 24, the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, the fourth wheel cylinder depressurization valve 44, the test simulation valve 51, the pedal simulation valve 61, a pedal travel sensor (PTS), a master cylinder pressure sensor (MCPS), and the brake circuit pressure sensor (BCPS).

It should be noted that the integration solution 3 may further include one or more of components such as a one-way valve, a filter, and a master cylinder push rod. All components included in the integration solution 3 may be integrated, and a connection relationship between each component and each pipe is shown in FIG. 3-*a*. The control relationship between the components is described in Embodiment 3.

It should be noted that the brake system provided in the integration solution 3 does not include a brake pedal 7, but may include the master cylinder push rod. When the brake system in the integration solution 3 is selected, different types of brake pedals 7 may be used to adapt to more vehicle models and provide more personalized matching possibilities. In addition, when a sales form of the brake system is the integration solution 3, the brake system may not include a wheel cylinder, but at least one wheel cylinder interface 4 is reserved. The at least one wheel cylinder interface 4 is configured to be connected to at least one wheel cylinder, and may provide braking pressure for the wheel cylinder. The brake system shown in FIG. 10-*a* or FIG. 10-*b* includes four wheel cylinder interfaces, and the wheel cylinder interfaces may be connected to four wheel cylinders in a one-to-one correspondence.

(2) Integration solution 4: The brake system may include: the first control unit 91, the second control unit 92, a master cylinder 1, the six-phase motor 201, the dual apply plunger 202, a pedal feeling simulator 6, the first master cylinder isolation valve 11, the second master cylinder isolation valve 12, the first booster control valve 21, the second booster control valve 22, the third booster control valve 23, the fourth booster control valve 24, the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, the fourth wheel cylinder depressurization valve 44, a fifth control valve 51, a sixth control valve 61, a pedal travel sensor (PTS), a master cylinder pressure sensor (MCPS), and the brake circuit pressure sensor (BCPS).

Compared with the integration solution 3, the integration solution 4 differs in that the brake fluid reservoir 5 is not included. Correspondingly, in the brake system in the integration solution 4, at least one interface 8 configured to be connected to the brake fluid reservoir 5 is added. It should be noted that a quantity of interfaces 8 may be adjusted based on an actual requirement.

The foregoing describes the system composition, the connection relationship, the control relationship, the integration manner, and the like of the brake system provided in Embodiment 3 with reference to FIG. 10-*a* and FIG. 10-*b*. The following describes a plurality of working modes of the brake system provided in Embodiment 3 with reference to FIG. 11 to FIG. 13.

The brake system provided in Embodiment 3 of this application includes at least three working modes: (1) An ECU 1 and an ECU 2 work cooperatively; (2) an ECU 1 works independently; or (3) an ECU 2 works independently.

Working mode 1: The ECU 1 and the ECU 2 work cooperatively.

FIG. 11 is a schematic diagram of a working mode of the brake system according to Embodiment 3 of this application. FIG. 11 shows a state in which the ECU 1 and the ECU 2 work cooperatively when the system is not faulty. In this case, the ECU 1 controls driving of three phases of a motor M, the ECU 2 controls driving of other three phases of the motor M, and the ECU 1 and the ECU 2 jointly drive the motor M to push an electric cylinder DAP, to implement quick system pressure establishment. The ECU 1 controls all solenoid valves except the third booster control valve 23 and the fourth booster control valve 24, calculates control signals of the motor and the solenoid valves based on a sensor signal, and sends the control signal of the motor M to the ECU 2. The ECU 1 and the ECU 2 work cooperatively to implement wheel pressure control, thereby implementing functions such as ABS/TCS/ESC/BBF/AEB/ACC.

Working mode 2: The ECU 1 works independently.

FIG. 12 is a schematic diagram of another working mode of the brake system according to Embodiment 3 of this application. FIG. 11 shows a state in which the ECU 1 works independently when the ECU 2 is faulty. In this case, the ECU 1 controls driving of three phases of a motor M to push an electric cylinder DAP, to implement system pressure establishment. The ECU 1 controls all solenoid valves except the third booster control valve 23 and the fourth booster control valve 24, and calculates control signals of the motor and the solenoid valves based on a sensor signal, to implement wheel pressure control, thereby implementing vehicle control functions such as ABS/TCS/ESC/BBF/AEB/ACC.

Working mode 3: The ECU 2 works independently.

FIG. 13 is a schematic diagram of another working mode of the brake system according to Embodiment 3 of this application. FIG. 12 shows a state in which the ECU 2 works independently when the ECU 1 is faulty. In this case, the ECU 2 controls driving of three phases of a motor M to push an electric cylinder DAP, to implement system pressure establishment. The ECU 2 controls the first master cylinder isolation valve 11, the second master cylinder isolation valve 12, the third booster control valve 23, the fourth booster control valve 24, and the pedal simulation valve 61; and calculates control signals of the motor M and the solenoid valves based on a sensor signal, to implement wheel pressure control. Because the ECU 2 cannot control the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, and the fourth wheel cylinder depressurization valve 44, only vehicle control functions such as BBF/AEB/ACC can be implemented in this working mode.

Embodiment 4

Figure 14:
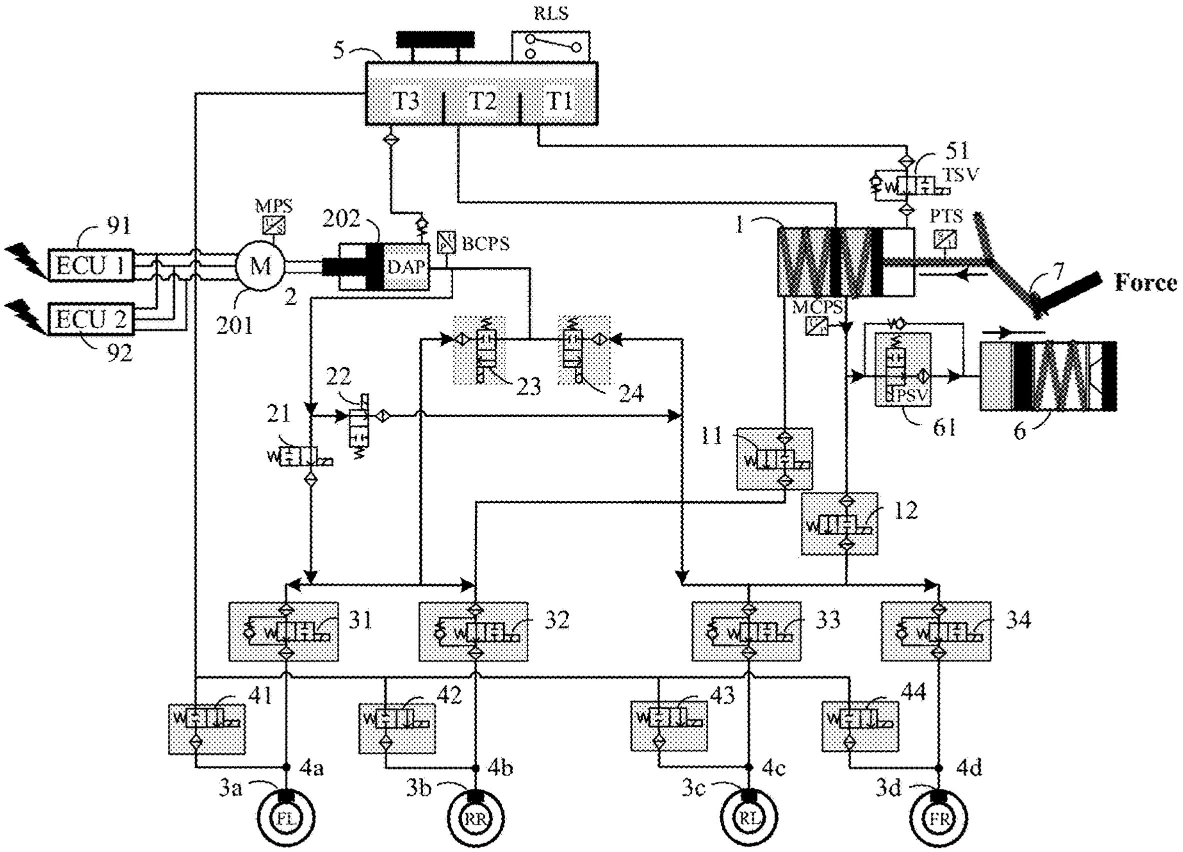
FIG. 14 is a schematic diagram of another working mode of another brake system according to an embodiment of this application.
Figure 15:
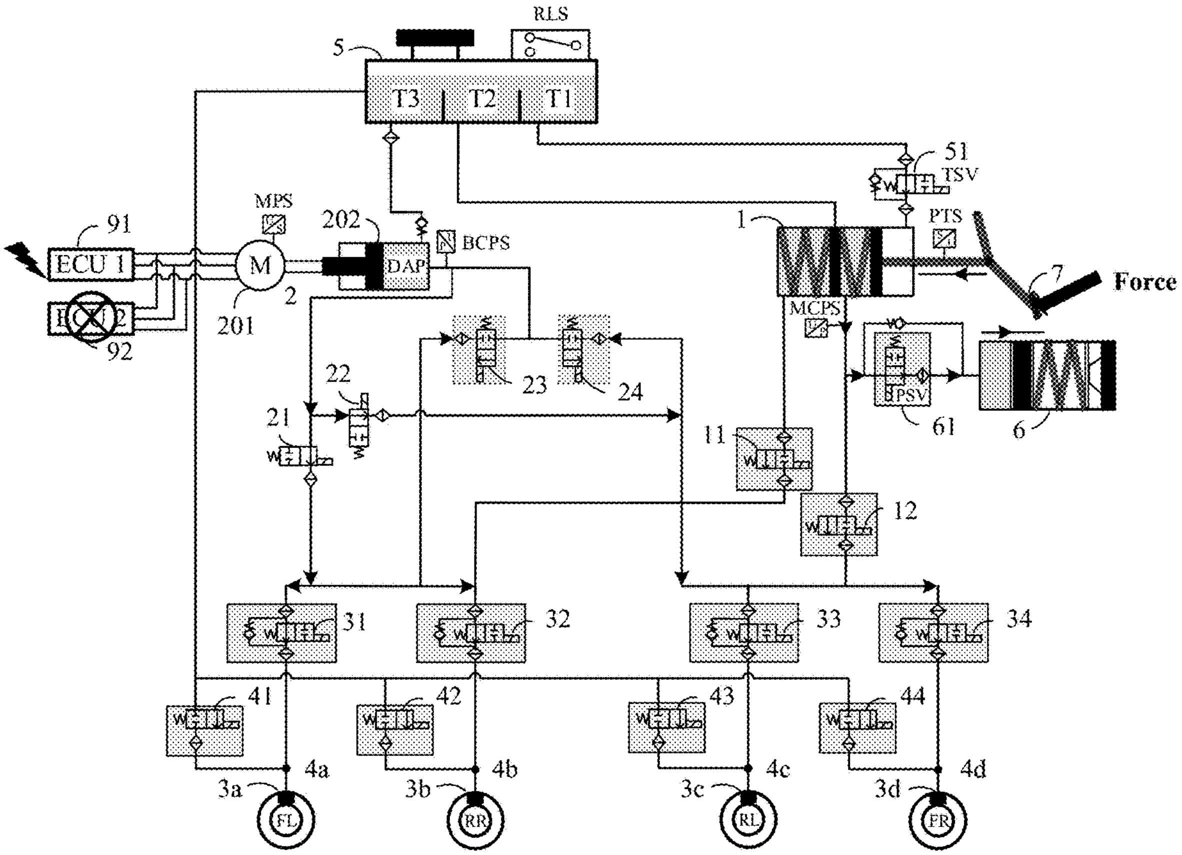
FIG. 15 is a schematic diagram of another working mode of another brake system according to an embodiment of this application.
Figure 16:
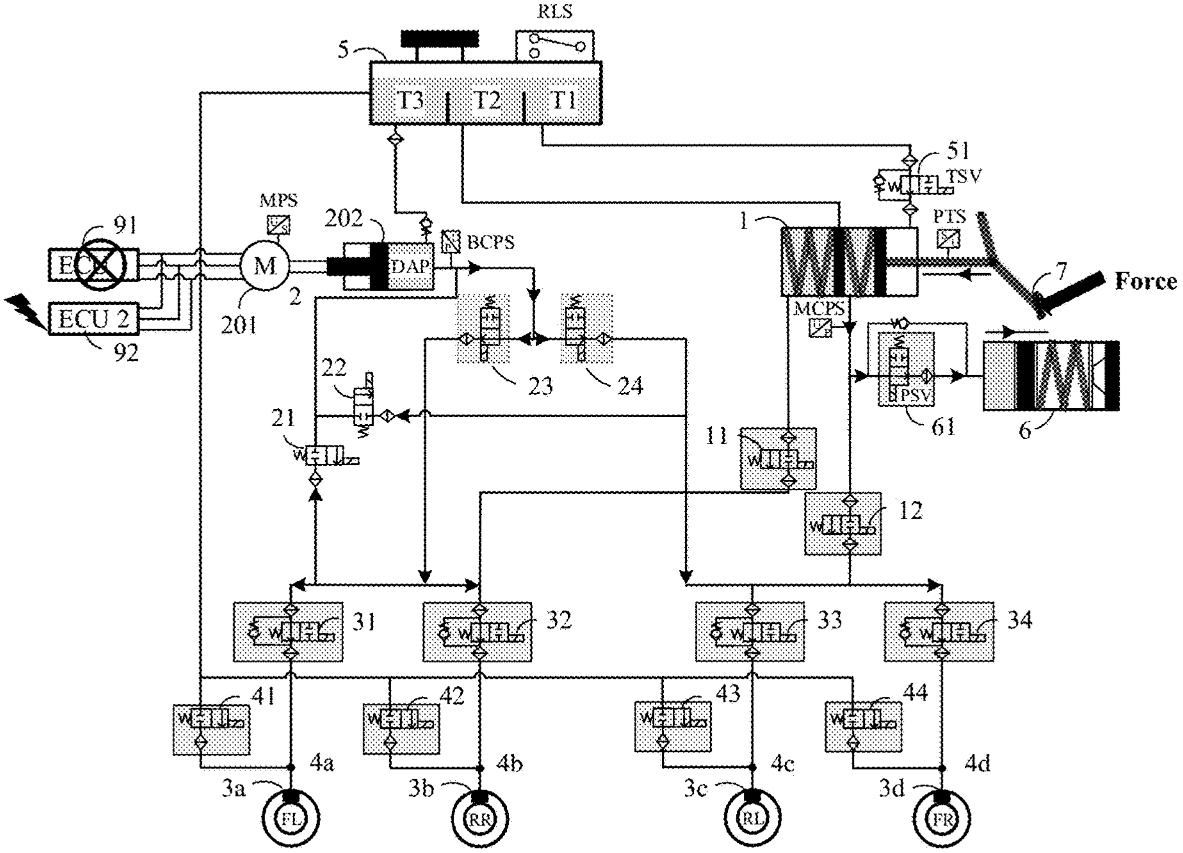
FIG. 16 is a schematic diagram of another working mode of another brake system according to an embodiment of this application.

Embodiment 4 of this application also provides a brake system. FIG. 14 to FIG. 16 are schematic diagrams of different working states of the brake system according to Embodiment 4 of this application. For the brake system provided in Embodiment 4 of this application, in terms of system composition, a connection relationship, an integration manner, and the like, refer to the description in Embodiment 3. Details are not described herein again. A difference between the brake system provided in Embodiment 4 of this application and the brake system provided in Embodiment 3 of this application lies in a redundancy design of a control unit.

Specifically, in Embodiment 4, objects controlled by a first control unit 91 and a second control unit 92 are separately as follows:

(1) The objects controlled by the first control unit 91 include: a six-phase motor 201, a first master cylinder isolation valve 11, a second master cylinder isolation valve 12, a first booster control valve 21, a second booster control valve 22, a first wheel cylinder pressurization valve 31, a second wheel cylinder pressurization valve 32, a third wheel cylinder pressurization valve 33, a fourth wheel cylinder pressurization valve 34, a first wheel cylinder depressurization valve 41, a second wheel cylinder depressurization valve 42, a third wheel cylinder depressurization valve 43, a fourth wheel cylinder depressurization valve 44, a test simulation valve 51, and a pedal simulation valve 61.

(2) The objects controlled by the second control unit 92 include: the six-phase motor 201, the first master cylinder isolation valve 11, the second master cylinder isolation valve 12, a third booster control valve 23, a fourth booster control valve 24, the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, the fourth wheel cylinder depressurization valve 44, and the pedal simulation valve 61.

It should be noted that, compared with that in the brake system provided in Embodiment 3, in the brake system provided in Embodiment 4 of this application, the second control unit 91 may further control the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, and the fourth wheel cylinder depressurization valve 44. In the brake system provided in Embodiment 4 of this application, a redundancy degree of brake system control is higher.

The foregoing describes the composition, the connection relationship, the control relationship, and the integration manner of the brake system provided in Embodiment 4 of this application. The following describes a plurality of working modes of the brake system provided in Embodiment 4 of this application with reference to FIG. 14 to FIG. 16.

The brake system provided in Embodiment 4 of this application includes at least three working modes: (1) An ECU 1 and an ECU 2 work cooperatively; (2) an ECU 1 works independently; or (3) an ECU 2 works independently.

Working mode 1: The ECU 1 and the ECU 2 work cooperatively.

FIG. 14 is a schematic diagram of a working mode of the brake system according to Embodiment 4 of this application. FIG. 14 shows a state in which the ECU 1 and the ECU 2 work cooperatively when the system is not faulty. In this case, the ECU 1 controls driving of three phases of a motor M, the ECU 2 controls driving of other three phases of the motor M, and the two ECUs jointly drive the motor M to push an electric cylinder DAP, to implement quick system pressure establishment. The ECU 1 controls all solenoid valves except the third booster control valve 23 and the fourth booster control valve 24, calculates control signals of the motor and the solenoid valves based on a sensor signal, and sends the control signal of the motor M to the ECU 2. The two ECUs work cooperatively to implement wheel pressure control, thereby implementing functions such as ABS/TCS/ESC/BBF/AEB/ACC.

Working mode 2: The ECU 1 works independently.

FIG. 15 is a schematic diagram of another working mode of the brake system according to Embodiment 4 of this application. FIG. 14 shows a state in which the ECU 1 works independently when the ECU 2 is faulty. In this case, the ECU 1 controls driving of three phases of a motor M to push an electric cylinder DAP, to implement system pressure establishment. The ECU 1 controls all solenoid valves except the third booster control valve 23 and the fourth booster control valve 24, and calculates control signals of the motor and the solenoid valves based on a sensor signal, to implement wheel pressure control, thereby implementing vehicle control functions such as ABS/TCS/ESC/BBF/AEB/ACC.

Working mode 3: The ECU 2 works independently.

FIG. 16 is a schematic diagram of another working mode of the brake system according to an embodiment of this application. FIG. 15 shows a state in which the ECU 2 works independently when the ECU 1 is faulty. In this case, the ECU 2 controls driving of three phases of a motor M to push an electric cylinder DAP, to implement system pressure establishment. The ECU 2 controls the first master cylinder isolation valve 11, the second master cylinder isolation valve 12, the third booster control valve 23, the fourth booster control valve 24, the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, the fourth wheel cylinder depressurization valve 44, and the pedal simulation valve 61; and calculates control signals of the motor and the solenoid valves based on a sensor signal, to implement wheel pressure control, thereby implementing vehicle control functions such as ABS/TCS/ESC/BBF/AEB/ACC.

The foregoing is the brake systems respectively provided in Embodiment 1 to Embodiment 4. In a specific implementation, the brake systems provided in the four embodiments each may integrate a plurality of components and serve as an integrated solution. With reference to Embodiment 5 to Embodiment 8, the following describes another implementation of the brake system provided in embodiments of this application.

Embodiment 5

Figure 17:
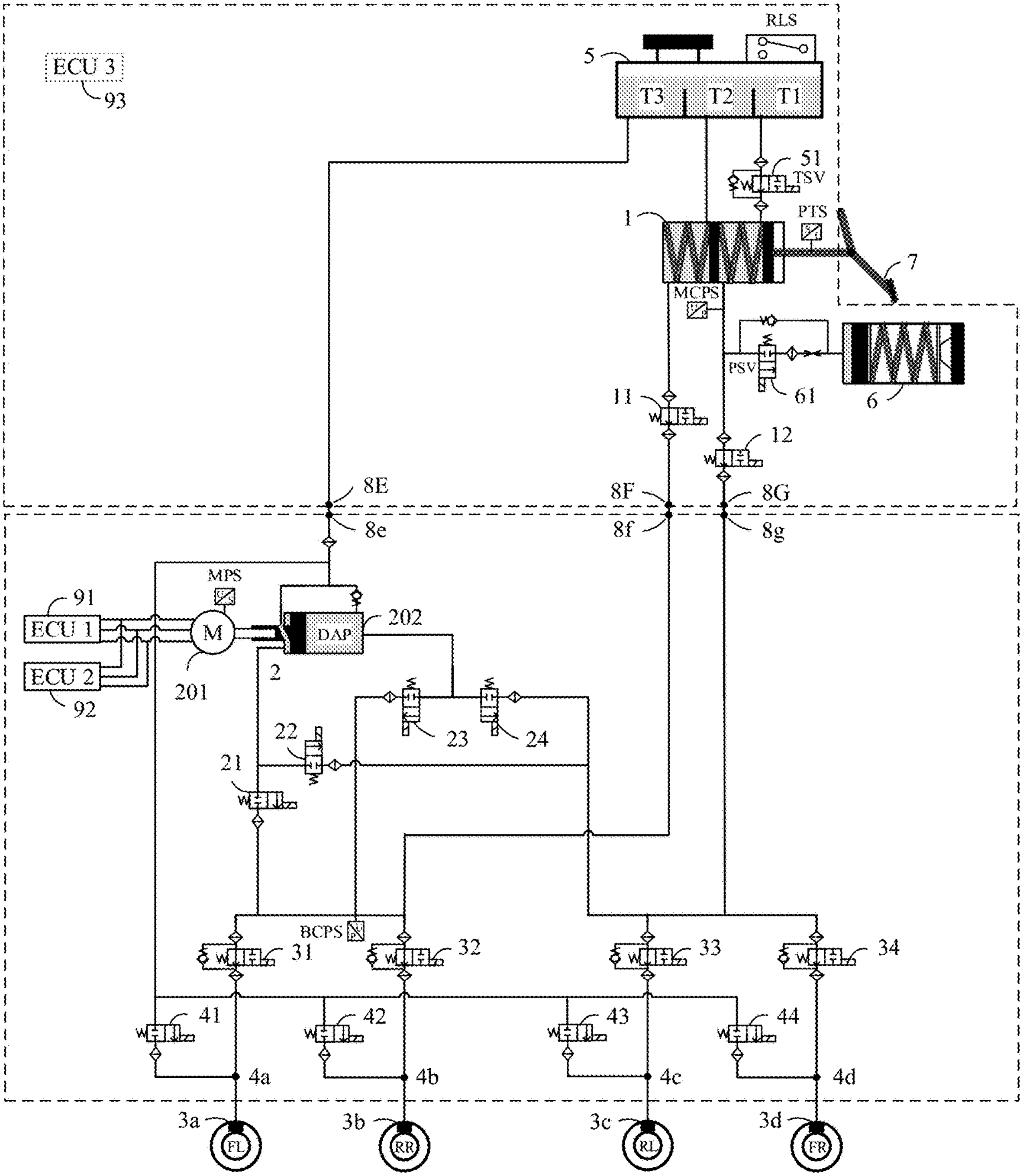
FIG. 17 is a schematic diagram of another brake system according to an embodiment of this application.
Figure 18:
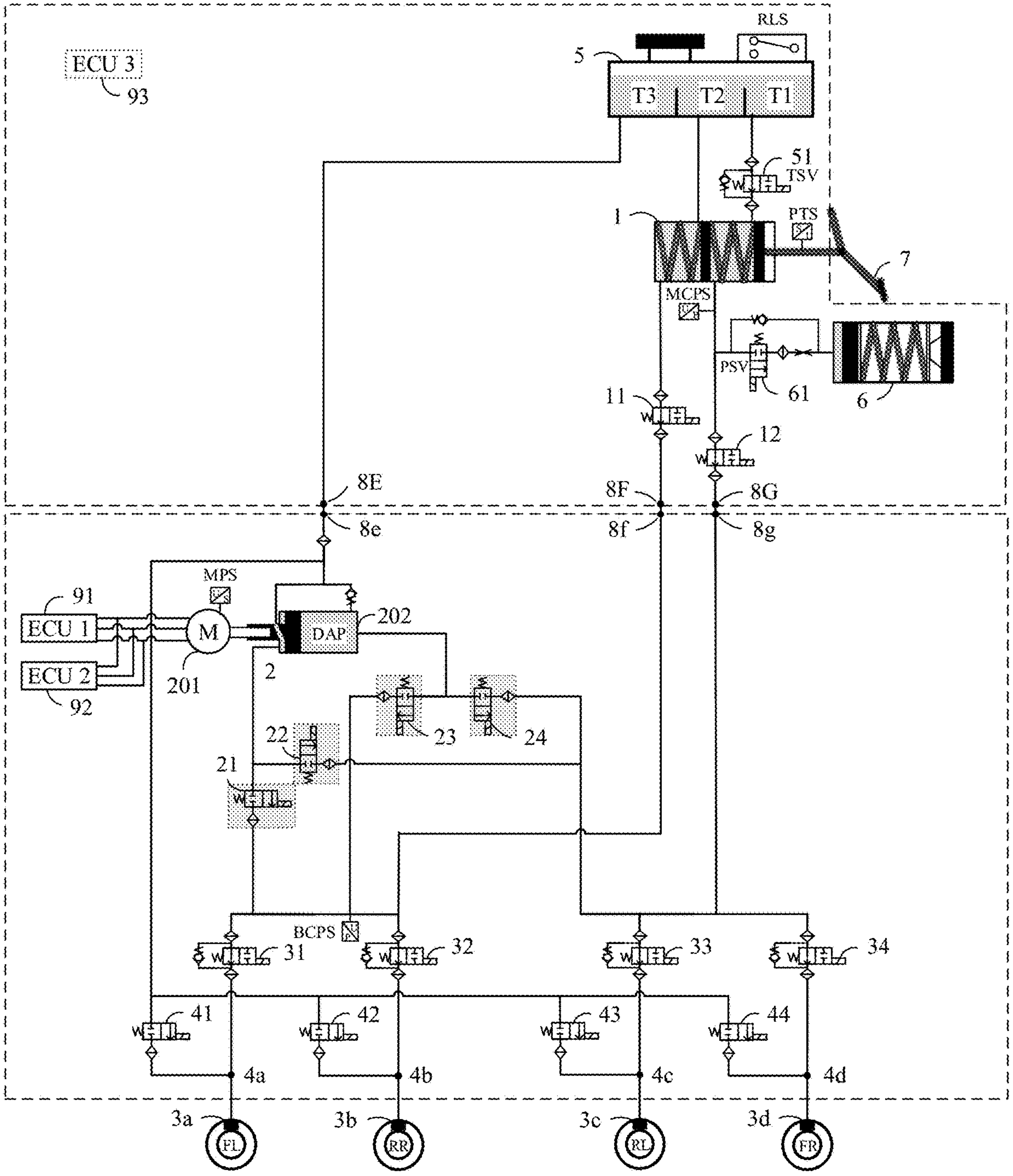
FIG. 18 is a schematic diagram of another brake system according to an embodiment of this application.

FIG. 17 is a schematic diagram of another brake system according to Embodiment 5 of this application. With reference to FIG. 17, the following describes aspects such as system composition, a connection relationship, and an integration manner of the brake system provided in Embodiment 5.

As shown in FIG. 17, the brake system provided in Embodiment 5 of this application includes two subsystems.

(1) A first subsystem includes: a first control unit 91, a second control unit 92, a six-phase motor 201, a dual apply plunger 202, a first booster control valve 21, a second booster control valve 22, a third booster control valve 23, a fourth booster control valve 24, a first wheel cylinder pressurization valve 31, a second wheel cylinder pressurization valve 32, a third wheel cylinder pressurization valve 33, a fourth wheel cylinder pressurization valve 34, a first wheel cylinder depressurization valve 41, a second wheel cylinder depressurization valve 42, a third wheel cylinder depressurization valve 43, a fourth wheel cylinder depressurization valve 44, a brake circuit pressure sensor BCPS, and a one-way valve.

(2) A second subsystem includes: a third control unit 93, a master cylinder 1, a brake fluid reservoir 5, a pedal feeling simulator 6, a first master cylinder isolation valve 11, a second master cylinder isolation valve 12, a test simulation valve 51, a pedal simulation valve 61, a pedal travel sensor PTS, a master cylinder pressure sensor MCPS, a reservoir level sensor RLS, and a one-way valve.

As shown in FIG. 17, the first subsystem further includes first interfaces (4*a*, 4*b*, 4*c*, and 4*d*), second interfaces (8*f* and 8*g*), and a third interface (8*e*). The first interfaces (4*a*, 4*b*, 4*c*, and 4*d*) are configured to be respectively connected to brake wheel cylinders (3*a*, 3*b*, 3*c*, and 3*d*) of wheels, the second interfaces (8*f* and 8*g*) are configured to be connected to the master cylinder 1, and the third interface (8*e*) is configured to be connected to the brake fluid reservoir 5. In addition, the second subsystem further includes interfaces (8E, 8F, and 8G) corresponding to the first subsystem.

In Embodiment 5, as shown in FIG. 17, the first subsystem and the second subsystem are connected to each other through the interface 8*e*, the interface 8*f*, and the interface 8*g* of the first subsystem and the interface 8E, the interface 8F, and the interface 8G of the second subsystem respectively, to form the brake system.

Specifically, the following describes the connection relationship of the brake system provided in Embodiment 5 of this application with reference to FIG. 17.

As shown in FIG. 17, a connection relationship between the master cylinder 1 and the brake wheel cylinders may be described as follows: A first main cavity of the master cylinder 1 is connected to the interface 8F through the first master cylinder isolation valve 11, and is separately connected to the first wheel cylinder pressurization valve 31 and the second wheel cylinder pressurization valve 32 through the interface 8*f*. The first wheel cylinder pressurization valve 31 is connected to a first wheel cylinder 3*a* through the interface 4*a*, and the second pressurization valve 32 is connected to a second wheel cylinder 3*b* through the interface 4*b*. A second main cavity of the master cylinder 1 is connected to the interface 8G through the second master cylinder isolation valve 12, and is separately connected to the third wheel cylinder pressurization valve 33 and the fourth wheel cylinder pressurization valve 34 through the interface 8*g*. The third wheel cylinder pressurization valve 33 is connected to a third wheel cylinder 3*c* through the interface 4*c*, and the fourth wheel cylinder pressurization valve 34 is connected to a fourth wheel cylinder 3*d* through the interface 4*d*.

As shown in FIG. 17, a connection relationship between a booster 2 and the brake wheel cylinders may be described as follows: A first booster cavity is separately connected to the first wheel cylinder pressurization valve 31 and the second wheel cylinder pressurization valve 32 through the first booster control valve 21 on a first booster branch. The first wheel cylinder pressurization valve 31 is connected to the first wheel cylinder 3*a* through the interface 4*a*, and the second wheel cylinder pressurization valve 32 is connected to the second wheel cylinder 3*b* through the interface 4*b*. In addition, the first booster cavity is separately connected to the third wheel cylinder pressurization valve 33 and the fourth wheel cylinder pressurization valve 34 through the second booster control valve 22 on the first booster branch. The third wheel cylinder pressurization valve 33 is connected to the third wheel cylinder 3*c* through the interface 4*c*, and the fourth wheel cylinder pressurization valve 34 is connected to the fourth wheel cylinder 3*d* through the interface 4*d*. Similarly, a second booster cavity is separately connected to the first wheel cylinder pressurization valve 31 and the second wheel cylinder pressurization valve 32 through the third booster control valve 23 on a second booster branch. The first wheel cylinder pressurization valve 31 is connected to the first wheel cylinder 3*a* through the interface 4*a*, and the second pressurization valve 32 is connected to the second wheel cylinder 3*b* through the interface 4*b*. In addition, the second booster cavity is separately connected to the third wheel cylinder pressurization valve 33 and the fourth wheel cylinder pressurization valve 34 through the fourth booster control valve 24 on the second booster branch. The third wheel cylinder pressurization valve 33 is connected to the third wheel cylinder 3*c* through the interface 4*c*, and the fourth wheel cylinder pressurization valve 34 is connected to the fourth wheel cylinder 3*d* through the interface 4*d*.

As shown in FIG. 17, the first master cylinder hydraulic cavity of the master cylinder 1 is connected to the brake fluid reservoir 5 through a first fluid storage pipe; the second master cylinder hydraulic cavity of the master cylinder 1 is connected to the brake fluid reservoir 5 through the test simulation valve 51; the first booster cavity of the booster 2 is connected to the interface 8*e*, and is connected to the fluid storage apparatus 5 through the interface 8E; the second booster cavity of the booster 2 is connected to the interface 8*e* through the one-way valve, and is connected to the brake fluid reservoir 5 through the interface 8E; first ends of the depressurization valves (41, 42, 43, and 44) are connected to the interface 8*e*, and are connected to the brake fluid reservoir 5 through the interface 8E; and second ends of the depressurization valves (41, 42, 43, and 44) are respectively connected to the first interfaces (4*a*, 4*b*, 4*c*, and 4*d*), and are respectively connected to the brake wheel cylinders (3*a*, 3*b*, 3*c*, and 3*d*) through the first interfaces (4*a*, 4*b*, 4*c*, and 4*d*).

As shown in FIG. 17, the pedal feeling simulator 6 is connected to the second main cavity of the master cylinder 1 through the pedal simulation valve 61. The pedal simulation valve 61 is further connected to the second main cavity of the master cylinder 1 through a one-way valve. Between the pedal feeling simulator 6 and the second main cavity, the pedal simulation valve 61 and the one-way valve are in a parallel relationship.

For other components shown in FIG. 17, for example, the master cylinder pressure sensor MCPS, the brake circuit pressure sensor BCPS, the reservoir level sensor RLS, the pedal travel sensor PTS, the one-way valve, and a filter, refer to the description in Embodiment 1.

In addition, in terms of the integration manner, the integration manner of the brake system provided in Embodiment 5 is different from the integration manners of the brake systems provided in Embodiment 1 to Embodiment 4. The integration manner of the brake system provided in Embodiment 5 is described herein with reference to FIG. 17.

(1) Integration solution 5: The brake system may include the first subsystem and the second subsystem. Composition and connection relationships of the first subsystem and the second subsystem are described above. The first subsystem and the second subsystem are connected to each other through the interfaces 8*e*, 8*f*, and 8*g* of the first subsystem and the interfaces 8E, 8F, and 8G of the second subsystem respectively and form the brake system. The first subsystem is further connected to the brake wheel cylinder 3*a*, the brake wheel cylinder 3*b*, the brake wheel cylinder 3*c*, and the brake wheel cylinder 3*d* through the interfaces 4*a*, 4*b*, 4*c*, and 4*d* respectively. The first subsystem and the second subsystem may be respectively integrated into a first module and a second module, and corresponding interfaces are reserved to adapt to different vehicle layout requirements.

(2) Integration solution 6: The brake system may include the first subsystem and the second subsystem. The second subsystem in the integration solution 6 is the same as the second subsystem in the integration solution 5. A difference from the integration manner 5 lies in that the second subsystem in the integrated manner 6 does not include the brake fluid reservoir 5, and at least one interface is reserved for the second subsystem in the integrated manner 6 to connect to the brake fluid reservoir 5. For a specific description or principle, refer to the description of the integration solution 2 of the brake system provided in Embodiment 1.

The foregoing describes the system composition, the connection relationship, and the integration manner of the brake system provided in Embodiment 5 with reference to FIG. 17. The following describes the control relationship of the brake system provided in Embodiment 5 with reference to FIG. 18.

(1) Objects controlled by the first control unit 91 include: the six-phase motor 201, the first booster control valve 21, the second booster control valve 22, the third booster control valve 23, the fourth booster control valve 24, the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, and the fourth wheel cylinder depressurization valve 44.

(2) Objects controlled by the second control unit 92 include: the six-phase motor 201, the first booster control valve 21, the second booster control valve 22, the third booster control valve 23, and the fourth booster control valve 24.

(3) Objects controlled by the third control unit 93 include: the first master cylinder isolation valve 11, the second master cylinder isolation valve 12, the test simulation valve 51, and the pedal simulation valve 61.

For different working modes of the brake system provided in Embodiment 5, refer to the description in Embodiment 1, and details are not described herein again. A difference from Embodiment 1 lies in that the third control unit 93 is added to the brake system provided in Embodiment 5, solenoid valves controlled by the control units are different, and the brake system provided in Embodiment 5 has a higher control redundancy degree.

Embodiment 6

Figure 19:
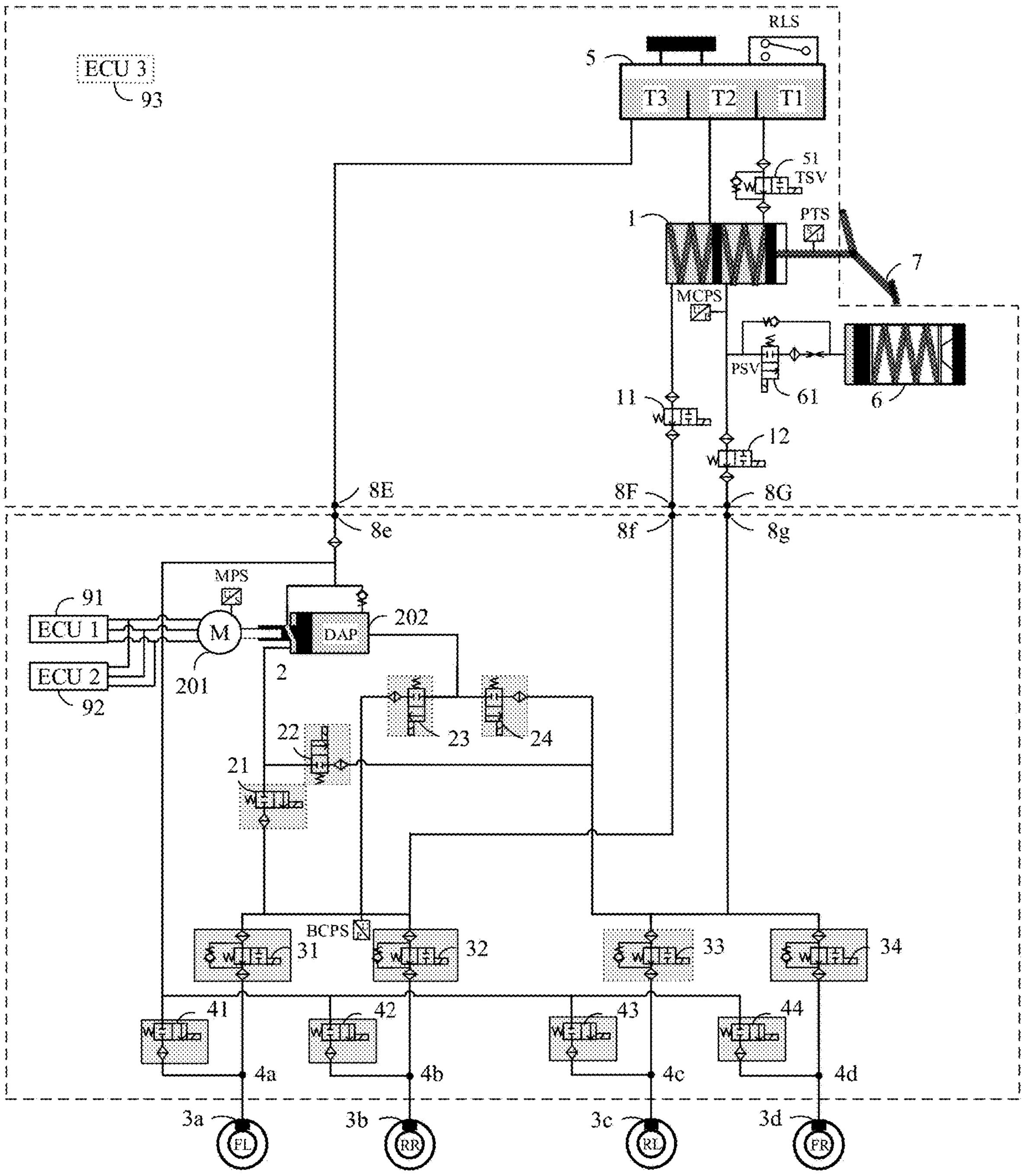
FIG. 19 is a schematic diagram of another brake system according to an embodiment of this application.

FIG. 19 is a schematic diagram of a brake system according to Embodiment 6 of this application. For the brake system provided in Embodiment 6 of this application, in terms of system composition, a connection relationship, an integration manner, and the like, refer to the description in Embodiment 5. Details are not described herein again. A difference between the brake system provided in Embodiment 6 of this application and the brake system provided in Embodiment 5 of this application lies in a redundancy design of a control unit.

Specifically, the control relationship of the brake system provided in Embodiment 6 is described with reference to FIG. 19.

(1) Objects controlled by a first control unit 91 include: a six-phase motor 201, a first booster control valve 21, a second booster control valve 22, a third booster control valve 23, a fourth booster control valve 24, a first wheel cylinder pressurization valve 31, a second wheel cylinder pressurization valve 32, a third wheel cylinder pressurization valve 33, a fourth wheel cylinder pressurization valve 34, a first wheel cylinder depressurization valve 41, a second wheel cylinder depressurization valve 42, a third wheel cylinder depressurization valve 43, and a fourth wheel cylinder depressurization valve 44.

(2) Objects controlled by a second control unit 92 include: the six-phase motor 201, the first booster control valve 21, the second booster control valve 22, the third booster control valve 23, the fourth booster control valve 24, the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, and the fourth wheel cylinder depressurization valve 44.

(3) Objects controlled by a third control unit 93 include: a first master cylinder isolation valve 11, a second master cylinder isolation valve 12, a test simulation valve 51, and a pedal simulation valve 61.

It should be noted that, compared with that in the brake system provided in Embodiment 5, in the brake system provided in Embodiment 6 of this application, the second control unit 91 may further control the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, and the fourth wheel cylinder depressurization valve 44. In the brake system provided in Embodiment 6 of this application, a redundancy degree of brake system control is higher.

For different working modes of the brake system provided in Embodiment 6, refer to the description in Embodiment 2, and details are not described herein again. A difference from Embodiment 2 lies in that the third control unit 93 is added to the brake system provided in Embodiment 6, solenoid valves controlled by the control units are different, and the brake system provided in Embodiment 6 has a higher control redundancy degree.

Embodiment 7

FIG. 20 is a schematic diagram of a brake system according to Embodiment 7 of this application. The brake system provided in Embodiment 7 is different from the brake system provided in Embodiment 5 or Embodiment 6 in terms of system composition, a connection relationship, an integration manner, a control relationship, and the like.

First, in terms of the system composition and the connection relationship, as shown in FIG. 20, the brake system provided in Embodiment 7 of this application includes two subsystems.

(1) A first subsystem includes: a first control unit 91, a second control unit 92, a six-phase motor 201, a single apply plunger 202, a first booster control valve 21, a second booster control valve 22, a third booster control valve 23, a fourth booster control valve 24, a first wheel cylinder pressurization valve 31, a second wheel cylinder pressurization valve 32, a third wheel cylinder pressurization valve 33, a fourth wheel cylinder pressurization valve 34, a first wheel cylinder depressurization valve 41, a second wheel cylinder depressurization valve 42, a third wheel cylinder depressurization valve 43, a fourth wheel cylinder depressurization valve 44, a brake circuit pressure sensor BCPS, and a one-way valve.

(2) A second subsystem includes: a third control unit 93, a master cylinder 1, a brake fluid reservoir 5, a pedal feeling simulator 6, a first master cylinder isolation valve 11, a second master cylinder isolation valve 12, a test simulation valve 51, a pedal simulation valve 61, a pedal travel sensor (PTS), a master cylinder pressure sensor (MCPS), a reservoir level sensor (RLS), and a one-way valve.

As shown in FIG. 20, the first subsystem further includes first interfaces (4*a*, 4*b*, 4*c*, and 4*d*), second interfaces (8*f* and 8*g*), and a third interface (8*e*). The first interfaces (4*a*, 4*b*, 4*c*, and 4*d*) are configured to be respectively connected to brake wheel cylinders (3*a*, 3*b*, 3*c*, and 3*d*) of wheels, the second interfaces (8*f* and 8*g*) are configured to be connected to the master cylinder 1, and the third interface (8*e*) is configured to be connected to the brake fluid reservoir 5. In addition, the second subsystem further includes interfaces (8E, 8F, and 8G) corresponding to the first subsystem.

In Embodiment 7, as shown in FIG. 20, the first subsystem and the second subsystem are connected to each other through the interface 8*e*, the interface 8*f*, and the interface 8*g* of the first subsystem and the interface 8E, the interface 8F, and the interface 8G of the second subsystem respectively, to form the brake system.

In terms of the system composition, a difference between the brake system provided in Embodiment 7 and the brake system provided in Embodiment 5 or Embodiment 6 includes that: A booster 2 of the brake system provided in Embodiment 7 uses the single apply plunger. Therefore, in terms of the connection relationship, the brake system provided in Embodiment 7 is also different from the brake system provided in Embodiment 5 or Embodiment 6.

Specifically, in Embodiment 7, a connection relationship between the single apply plunger of the booster 2 in the first subsystem and the brake wheel cylinders may be described as follows: The single apply plunger is separately connected to the first wheel cylinder pressurization valve 31 and the second wheel cylinder pressurization valve 32 through the first booster control valve 21 on a first booster branch. The first wheel cylinder pressurization valve 31 is connected to a first wheel cylinder 3*a* through the interface 4*a*, and the second pressurization valve 32 is connected to a second wheel cylinder 3*b* through the interface 4*b*. In addition, the single apply plunger is separately connected to the third wheel cylinder pressurization valve 33 and the fourth wheel cylinder pressurization valve 34 through the second booster control valve 22 on the first booster branch. The third wheel cylinder pressurization valve 33 is connected to a third wheel cylinder 3*c* through the interface 4*c*, and the fourth wheel cylinder pressurization valve 34 is connected to a fourth wheel cylinder 3*d* through the interface 4*d*. Similarly, the single apply plunger is separately connected to the first wheel cylinder pressurization valve 31 and the second wheel cylinder pressurization valve 32 through the third booster control valve 23 on a second booster branch. The first wheel cylinder pressurization valve 31 is connected to the first wheel cylinder 3*a* through the interface 4*a*, and the second pressurization valve 32 is connected to the second wheel cylinder 3*b* through the interface 4*b*. In addition, the single apply plunger is separately connected to the third wheel cylinder pressurization valve 33 and the fourth wheel cylinder pressurization valve 34 through the fourth booster control valve 24 on the second booster branch. The third wheel cylinder pressurization valve 33 is connected to the third wheel cylinder 3*c* through the interface 4*c*, and the fourth wheel cylinder pressurization valve 34 is connected to the fourth wheel cylinder 3*d* through the interface 4*d*.

As shown in FIG. 20, in Embodiment 7, the brake circuit pressure sensor BCPS of the booster 2 is disposed between the second control valves (21, 22, 23, and 24) and the single apply plunger of the booster 2, for example, may be disposed between the first booster control valve 21 and the single apply plunger 202. An appropriate position is selected, so that the brake circuit pressure sensor BCPS can obtain oil pressure output by the single apply plunger of the booster 2 to a brake circuit in different working modes.

In terms of the integration manner, the integration manner of the brake system provided in Embodiment 7 is different from the integration manner of the brake system provided in Embodiment 5 or Embodiment 6. The following provides specific description with reference to FIG. 20.

(1) Integration solution 7: As shown in FIG. 20, the brake system provided in Embodiment 7 may also be divided into two subsystems for integration: the first subsystem, where a main difference between the first subsystem in Embodiment 7 and the first subsystem in Embodiment 5 or Embodiment 6 lies in that the first subsystem in Embodiment 7 uses the single apply plunger 202, and as described above, the connection relationship in the first subsystem is changed, and the position of the brake circuit pressure sensor BCPS is also adjusted; and the second subsystem, where the second subsystem in Embodiment 7 is the same as the second subsystem in Embodiment 5 or Embodiment 6.

(2) Integration solution 8: The brake system may include the first subsystem and the second subsystem. The second subsystem in the integration solution 8 is the same as the second subsystem in the integration solution 7. A difference from the integration manner 7 lies in that the second subsystem in the integrated manner 8 does not include the brake fluid reservoir 5, and at least one interface is reserved for the second subsystem in the integrated manner 8 to connect to the brake fluid reservoir 5. For a specific description or principle, refer to the description of the integration solution 2 of the brake system provided in Embodiment 1.

Figure 21:
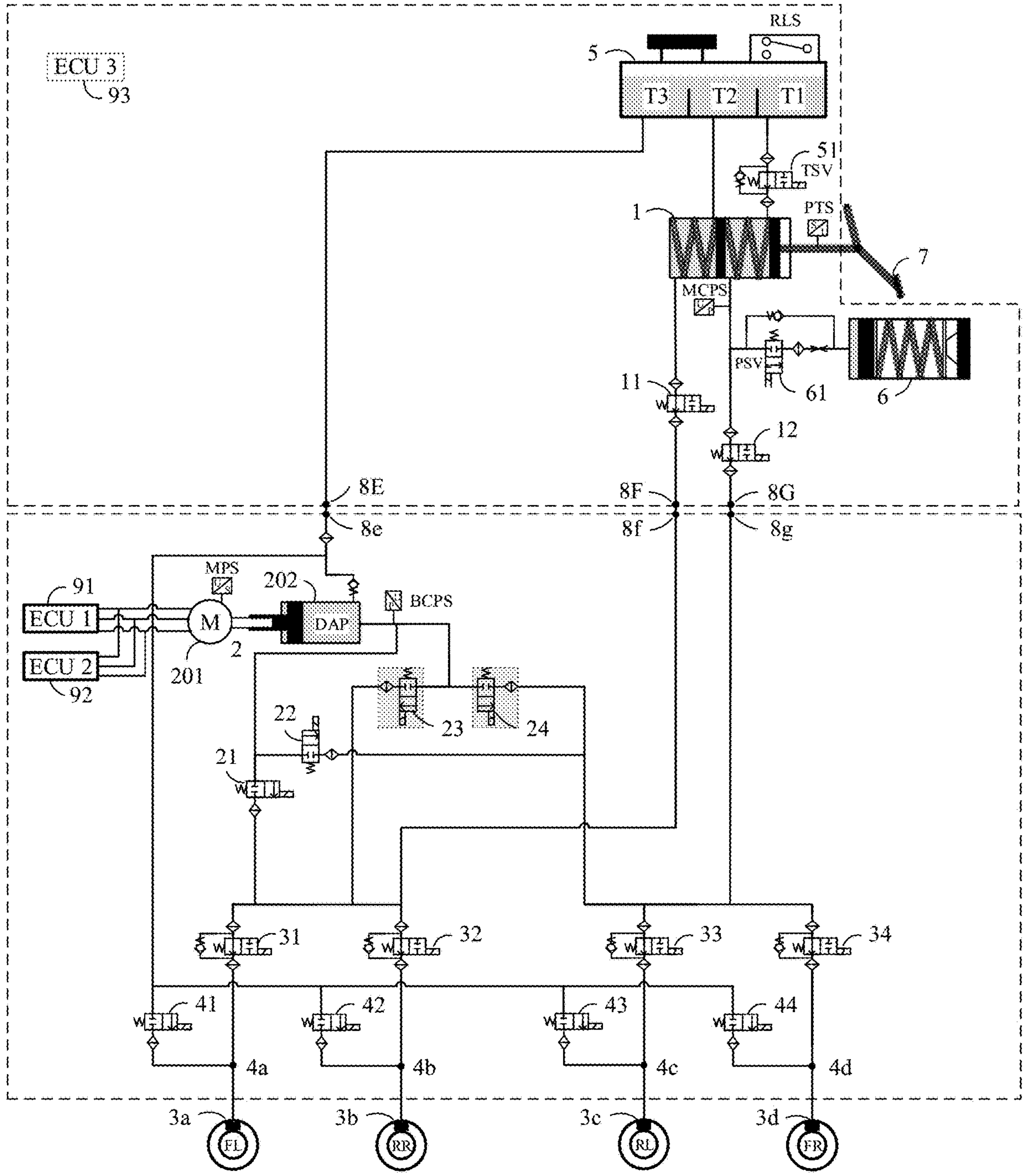
FIG. 21 is a schematic diagram of another brake system according to an embodiment of this application.

Third, in terms of the control relationship, as shown in FIG. 21, in the brake system provided in Embodiment 7, objects controlled by the first control unit 91, the second control unit 92, and the third control unit 93 are separately as follows:

(1) The objects controlled by the first control unit 91 include: the six-phase motor 201, the first booster control valve 21, the second booster control valve 22, the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, and the fourth wheel cylinder depressurization valve 44.

(2) The objects controlled by the second control unit 92 include: the six-phase motor 201, the third booster control valve 23, and the fourth booster control valve 24. In the brake system provided in Embodiment 7, the second control unit 92 independently controls the third booster control valve 23 and the fourth booster control valve 24, as shown in a range covered by a dashed line box with a gray background in FIG. 21.

(3) The objects controlled by the third control unit 93 include: the first master cylinder isolation valve 11, the second master cylinder isolation valve 12, the test simulation valve 51, and the pedal simulation valve 61.

For different working modes of the brake system provided in Embodiment 7, refer to the description in Embodiment 3, and details are not described herein again. A difference from Embodiment 3 lies in that the third control unit 93 is added to the brake system provided in Embodiment 7, solenoid valves controlled by the control units are different, and the brake system provided in Embodiment 7 has a higher control redundancy degree.

Embodiment 8

Figure 22:
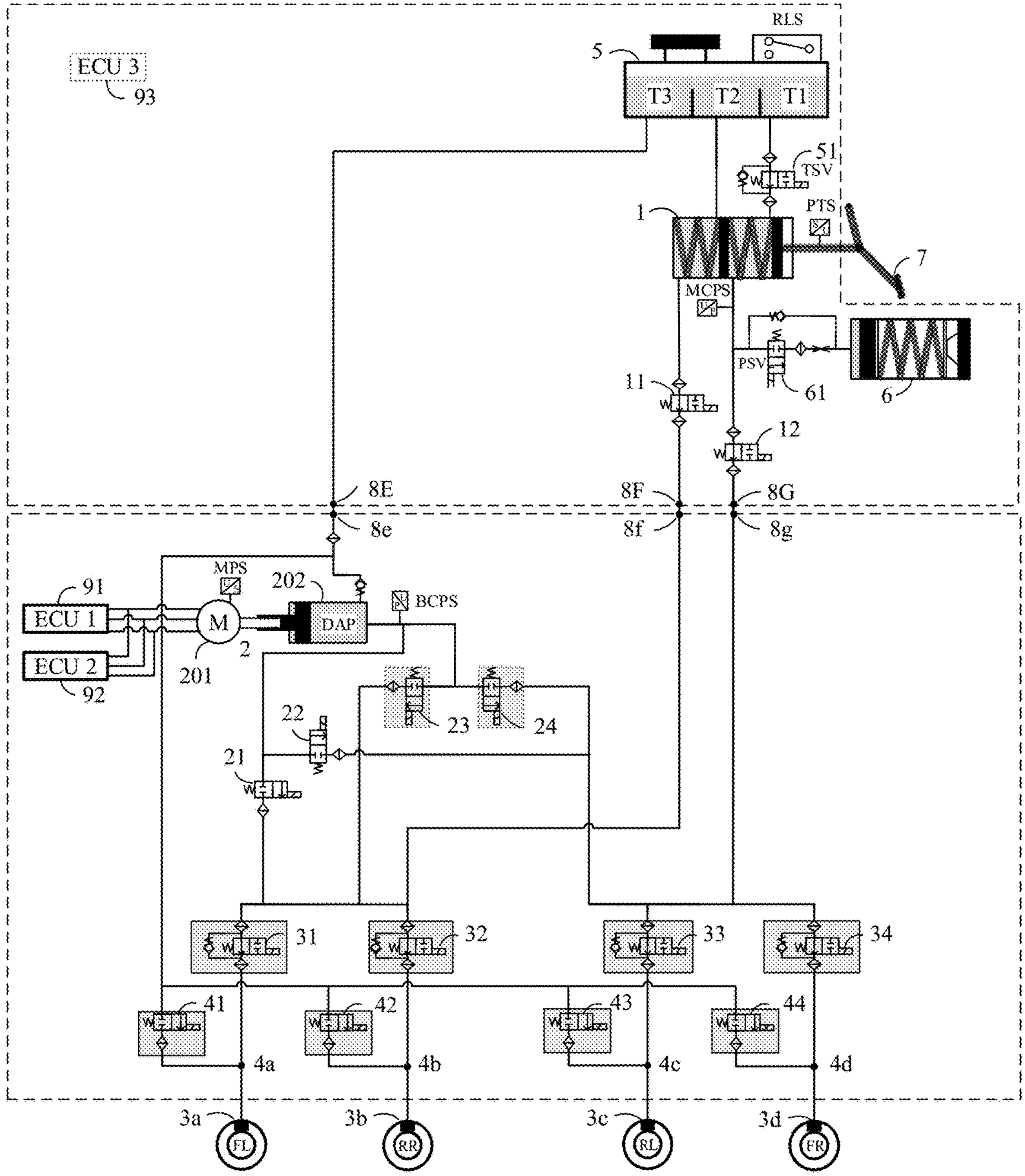
FIG. 22 is a schematic diagram of another brake system according to an embodiment of this application.

FIG. 22 is a schematic diagram of another brake system according to Embodiment 8 of this application. The brake system provided in Embodiment 8 and the brake system provided in Embodiment 7 are basically the same in terms of system composition, a connection relationship, and an integration manner, and are different in terms of a control relationship.

In terms of the control relationship, as shown in FIG. 22, in the brake system provided in Embodiment 8, objects controlled by a first control unit 91, a second control unit 92, and a third control unit 93 are separately as follows:

(1) The objects controlled by the first control unit 91 include: a six-phase motor 201, a first booster control valve 21, a second booster control valve 22, a first wheel cylinder pressurization valve 31, a second wheel cylinder pressurization valve 32, a third wheel cylinder pressurization valve 33, a fourth wheel cylinder pressurization valve 34, a first wheel cylinder depressurization valve 41, a second wheel cylinder depressurization valve 42, a third wheel cylinder depressurization valve 43, and a fourth wheel cylinder depressurization valve 44.

(2) The objects controlled by the second control unit 92 include: the six-phase motor 201, a third booster control valve 23, a fourth booster control valve 24, the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, and the fourth wheel cylinder depressurization valve 44.

(3) The objects controlled by the third control unit 93 include: a first master cylinder isolation valve 11, a second master cylinder isolation valve 12, a test simulation valve 51, and a pedal simulation valve 61.

In the brake system provided in Embodiment 8, the second control unit 92 independently controls the third booster control valve 23 and the fourth booster control valve 24, as shown in a range covered by a dashed box with a gray background in FIG. 22. The second control unit 92 and the first control unit 91 jointly control the first wheel cylinder pressurization valve 31, the second wheel cylinder pressurization valve 32, the third wheel cylinder pressurization valve 33, the fourth wheel cylinder pressurization valve 34, the first wheel cylinder depressurization valve 41, the second wheel cylinder depressurization valve 42, the third wheel cylinder depressurization valve 43, and the fourth wheel cylinder depressurization valve 44, as shown in a range covered by a solid box with a gray background in FIG. 22.

For different working modes of the brake system provided in Embodiment 8, refer to the description in Embodiment 4, and details are not described herein again. A difference from Embodiment 3 lies in that the third control unit 93 is added to the brake system provided in Embodiment 7, solenoid valves controlled by the control units are different, and the brake system provided in Embodiment 7 has a higher control redundancy degree.

According to Embodiment 5 to Embodiment 8, the brake system provided in this application may be a mechanical hydraulic apparatus that integrates a hydraulic valve plate, a solenoid valve, a motor, and the like and that may be used for a hydraulic regulator of a brake system of an autonomous driving vehicle. The mechanical hydraulic apparatus may include two modules: a first brake module and a second brake module. The two modules are connected to each other through a hydraulic pipe, and are connected to a brake pedal, a vehicle brake wheel cylinder, and another signal interface to form an entire vehicle brake system.

The brake systems provided in Embodiment 1 to Embodiment 8 of this application have advantages of high redundancy, high integration, a small size, flexible module division, low costs, high reliability, and high safety, and meet a requirement of integrated brake functions such as ABS/BBF/TCS/ESC/AEB/ACC of a vehicle.

The foregoing descriptions are merely specific implementations of this application, but are not intended to limit a protection scope of this application. Any variation or replacement readily figured out by a person skilled in the art based on the disclosure of this application shall fall within the protection scope of this application.

What is claimed is:

1. A brake system, wherein the brake system comprises: a master cylinder, a booster, at least one first control valve, at least one second control valve, at least one third control valve, at least one first interface, a first electronic controller, and a second electronic controller;

a first end of the at least one third control valve is respectively connected to the at least one first interface;

a second end of the at least one third control valve is connected to the master cylinder through the at least one first control valve;

the second end of the at least one third control valve is further connected to the booster through the at least one second control valve;

the at least one third control valve is configured to be controlled by the first electronic controller;

the at least one second control valve comprises at least one first booster branch control valve and at least one second booster branch control valve, the at least one first booster branch control valve is configured to be controlled by the first electronic controller, and the at least one second booster branch control valve is configured to be controlled by the second electronic controller; and the booster is configured to be separately controlled by the first electronic controller and the second electronic controller, wherein the booster comprises a booster drive apparatus with a six-phase motor comprising a first winding and a second winding, the first winding is configured to be controlled by the first electronic controller, and the second winding is configured to be controlled by the second electronic controller.

2. The brake system according to claim 1, wherein the booster comprises a booster hydraulic cylinder, and the booster drive apparatus is configured to be separately controlled by the first electronic controller and the second electronic controller.

3. The brake system according to claim 2, wherein the booster hydraulic cylinder is a bidirectional pressurization hydraulic cylinder, the booster hydraulic cylinder comprises a first booster cavity and a second booster cavity, the at least one first booster branch control valve is connected to the first booster cavity, and the at least one second booster branch control valve is connected to the second booster cavity.

4. The brake system according to claim 2, wherein the booster hydraulic cylinder is a unidirectional pressurization hydraulic cylinder, and the at least one first booster branch control valve and the at least one second booster branch control valve are connected in parallel, and are separately connected to the booster hydraulic cylinder.

5. The brake system according to claim 3, further comprising a brake fluid reservoir and a fifth control valve, wherein the brake fluid reservoir is separately connected to the master cylinder and the booster, a first end of the fifth control valve is connected to the master cylinder, and a second end of the fifth control valve is configured to be connected to the brake fluid reservoir.

6. The brake system according to claim 5, further comprising a pedal feeling simulator and a sixth control valve, wherein the pedal feeling simulator is connected to the master cylinder through the sixth control valve.

7. The brake system according to claim 6, further comprising at least one fourth control valve, wherein a first end of the at least one fourth control valve is respectively connected to the at least one first interface, an other end of the at least one fourth control valve is configured to be connected to the brake fluid reservoir, and the at least one fourth control valve is configured to be controlled by the first electronic controller.

8. The brake system according to claim 7, wherein the at least one first booster branch control valve is further configured to be controlled by the second electronic controller, and the at least one second booster branch control valve is further configured to be controlled by the first electronic controller.

9. The brake system according to claim 7, wherein the at least one third control valve and the at least one fourth control valve are further configured to be controlled by the second electronic controller.

10. The brake system according to claim 7, wherein the at least one first control valve is configured to be separately controlled by the first electronic controller and the second electronic controller;

the fifth control valve is configured to be controlled by the first electronic controller; and the sixth control valve is configured to be separately controlled by the first electronic controller and the second electronic controller.

11. The brake system according to claim 7, further comprising a third electronic controller, wherein the at least one first control valve is configured to be controlled by the third electronic controller;

the fifth control valve is configured to be controlled by the third electronic controller; and the sixth control valve is configured to be controlled by the third electronic controller.

12. The brake system according to claim 11, further comprising at least one second interface and at least one third interface, wherein the at least one first control valve is separately connected to the at least one third control valve through the at least one second interface, the at least one fourth control valve is connected to the brake fluid reservoir through the third interface, and the booster is connected to the brake fluid reservoir through the at least one third interface.

13. A hydraulic apparatus, wherein the hydraulic apparatus comprises: a booster, at least one second control valve, at least one third control valve, at least one fourth control valve, a first electronic controller, a second electronic controller, at least one first interface, at least one second interface, and at least one third interface;

a first end of the at least one third control valve is respectively connected to the at least one first interface;

a second end of the at least one third control valve is connected to the at least one second interface, and the at least one second interface is configured to be connected to a master cylinder;

the second end of the at least one third control valve is further connected to the booster through the at least one second control valve;

the booster is connected to the at least one third interface, and the at least one third interface is configured to be connected to a brake fluid reservoir;

a first end of the at least one fourth control valve is connected to the at least one first interface, and a second end of the at least one fourth control valve is connected to the at least one third interface;

the at least one third control valve is configured to be controlled by the first electronic controller;

the at least one second control valve comprises at least one first booster branch control valve and at least one second booster branch control valve, the at least one first booster branch control valve is configured to be controlled by the first electronic controller, and the at least one second booster branch control valve is configured to be controlled by the second electronic controller; and the booster is configured to be separately controlled by the first electronic controller and the second electronic controller, wherein the booster comprises a booster drive apparatus with a six-phase motor comprising a first winding and a second winding, the first winding is configured to be controlled by the first electronic controller, and the second winding is configured to be controlled by the second electronic controller.

14. The hydraulic apparatus according to claim 13, wherein the booster comprises a booster hydraulic cylinder, and the booster drive apparatus is configured to be separately controlled by the first electronic controller and the second electronic controller.

15. The hydraulic apparatus according to claim 14, wherein the booster hydraulic cylinder is a bidirectional pressurization hydraulic cylinder, the booster hydraulic cylinder comprises a first booster cavity and a second booster cavity, the at least one first booster branch control valve is connected to the first booster cavity, and the at least one second booster branch control valve is connected to the second booster cavity.

16. The hydraulic apparatus according to claim 14, wherein the booster hydraulic cylinder is a unidirectional pressurization hydraulic cylinder, and the at least one first booster branch control valve and the at least one second booster branch control valve are connected in parallel, and are separately connected to the booster hydraulic cylinder.

17. The hydraulic apparatus according to claim 15, wherein the at least one first booster branch control valve is further configured to be controlled by the second electronic controller, and the at least one second booster branch control valve is further configured to be controlled by the first electronic controller.

18. A vehicle, wherein the vehicle comprises a brake system comprising: a master cylinder, a booster, at least one first control valve, at least one second control valve, at least one third control valve, at least one first interface, a first electronic controller, and a second electronic controller;

a first end of the at least one third control valve is respectively connected to the at least one first interface;

a second end of the at least one third control valve is connected to the master cylinder through the at least one first control valve;

the second end of the at least one third control valve is further connected to the booster through the at least one second control valve;

the at least one third control valve is configured to be controlled by the first electronic controller;

the at least one second control valve comprises at least one first booster branch control valve and at least one second booster branch control valve, the at least one first booster branch control valve is configured to be controlled by the first electronic controller, and the at least one second booster branch control valve is configured to be controlled by the second electronic controller; and the booster is configured to be separately controlled by the first electronic controller and the second electronic controller, wherein the booster comprises a booster drive apparatus with a six-phase motor comprising a first winding and a second winding, the first winding is configured to be controlled by the first electronic controller, and the second winding is configured to be controlled by the second electronic controller.

19. The vehicle according to claim 18, wherein the booster comprises a booster hydraulic cylinder, and the booster drive apparatus is configured to be separately controlled by the first electronic controller and the second electronic controller.

20. The vehicle according to claim 19, wherein the booster hydraulic cylinder is a bidirectional pressurization hydraulic cylinder, the booster hydraulic cylinder comprises a first booster cavity and a second booster cavity, the at least one first booster branch control valve is connected to the first booster cavity, and the at least one second booster branch control valve is connected to the second booster cavity.

* * * * *